April 2, 1957  P. W. JACOBSEN  2,787,467
FEEDING AND TAKEOFF MECHANISM
Filed Sept. 8, 1953  17 Sheets-Sheet 1
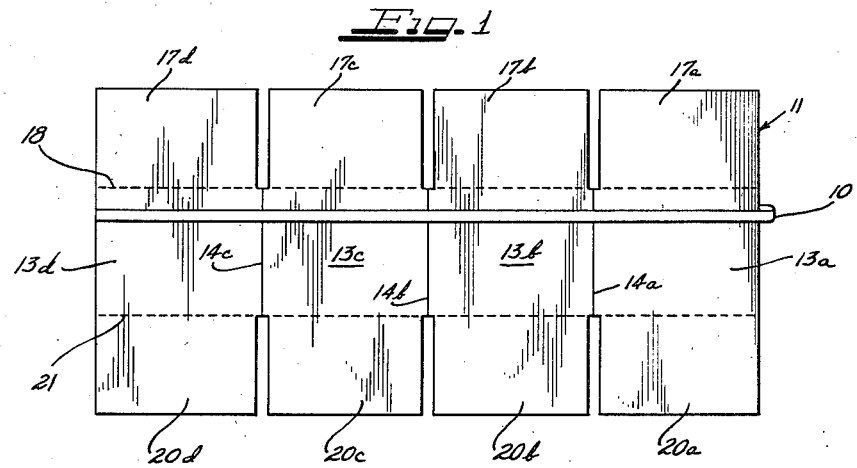
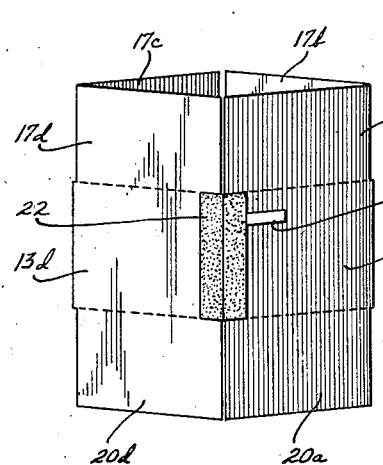
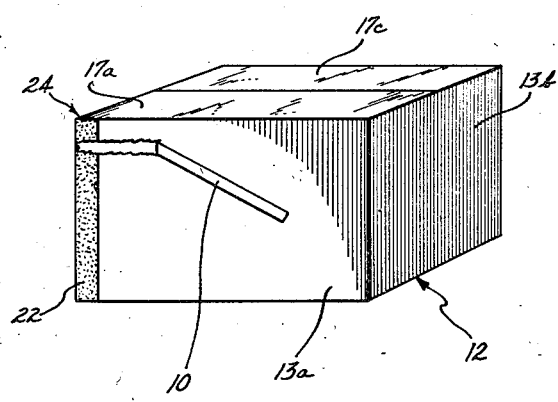
Inventor
PAUL W. JACOBSEN April 2, 1957 P. W. JACOBSEN 2,787,467
FEEDING AND TAKEOFF MECHANISM
Filed Sept. 8, 1953 17 Sheets-Sheet 2

Inventor
PAUL W. JACOBSEN
by Hill, Sherman, Meroni, Gross & Simpson Attys.

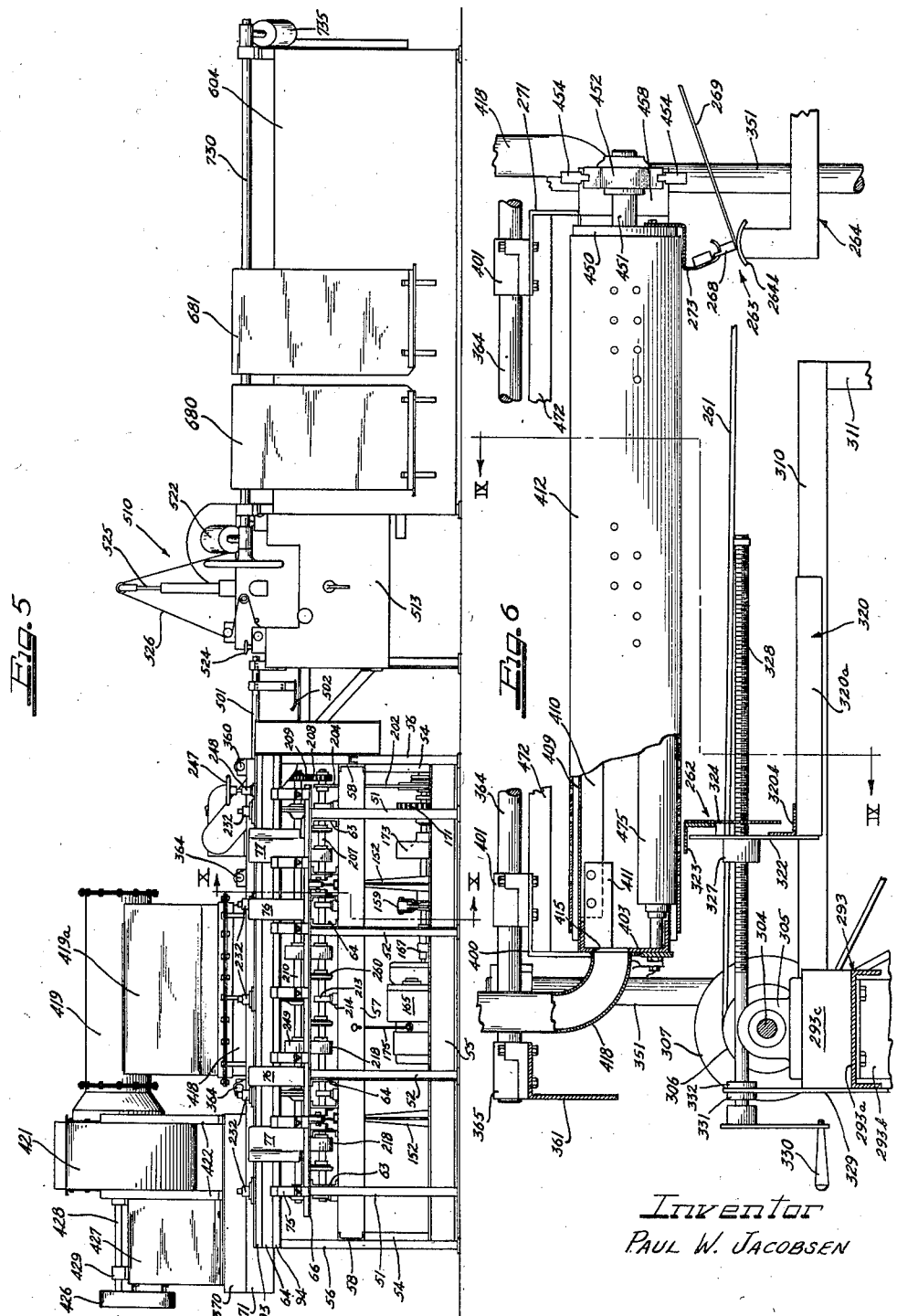

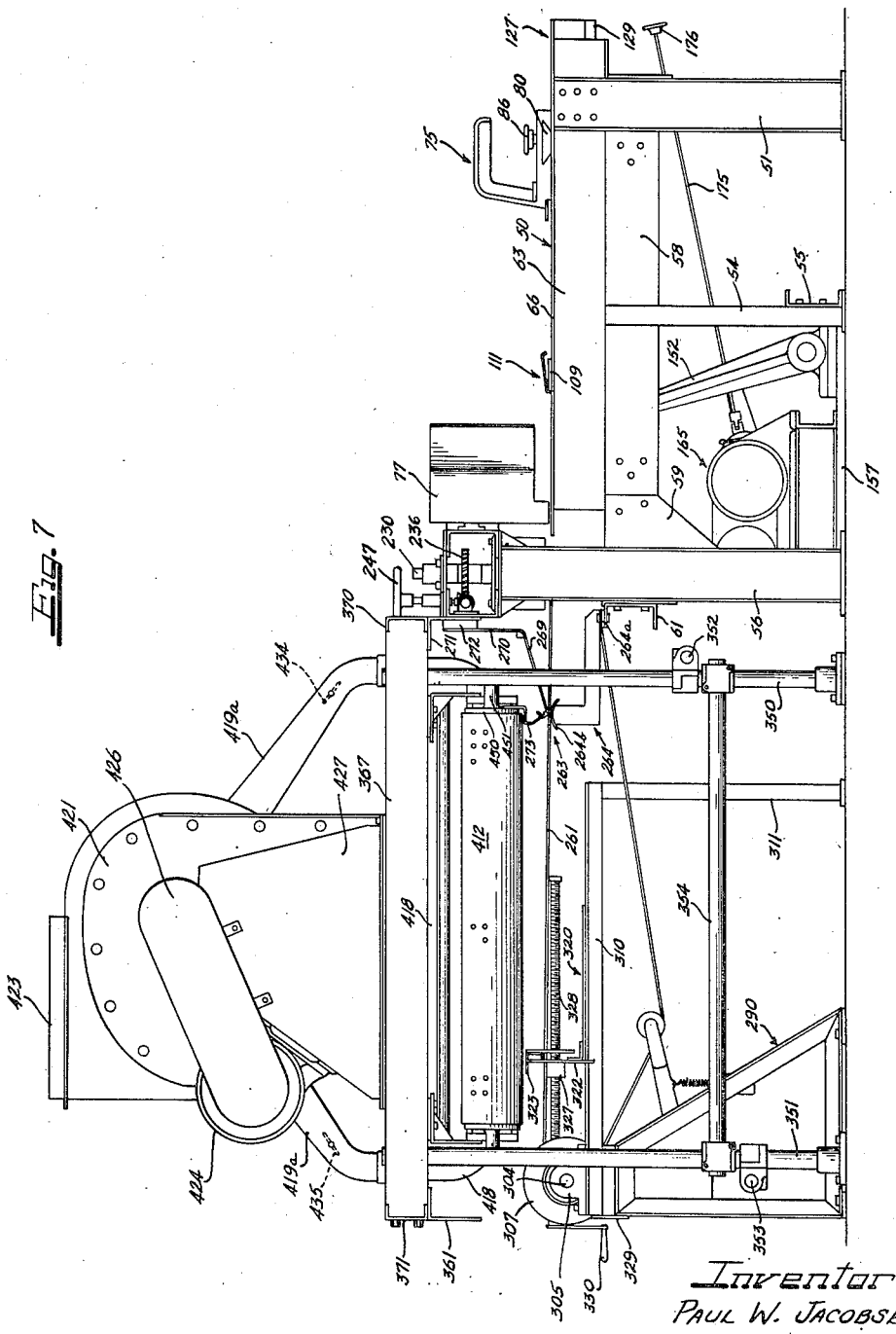

April 2, 1957 P. W. JACOBSEN 2,787,467
FEEDING AND TAKEOFF MECHANISM
Filed Sept. 8, 1953 17 Sheets-Sheet 5

Inventor
PAUL W. JACOBSEN

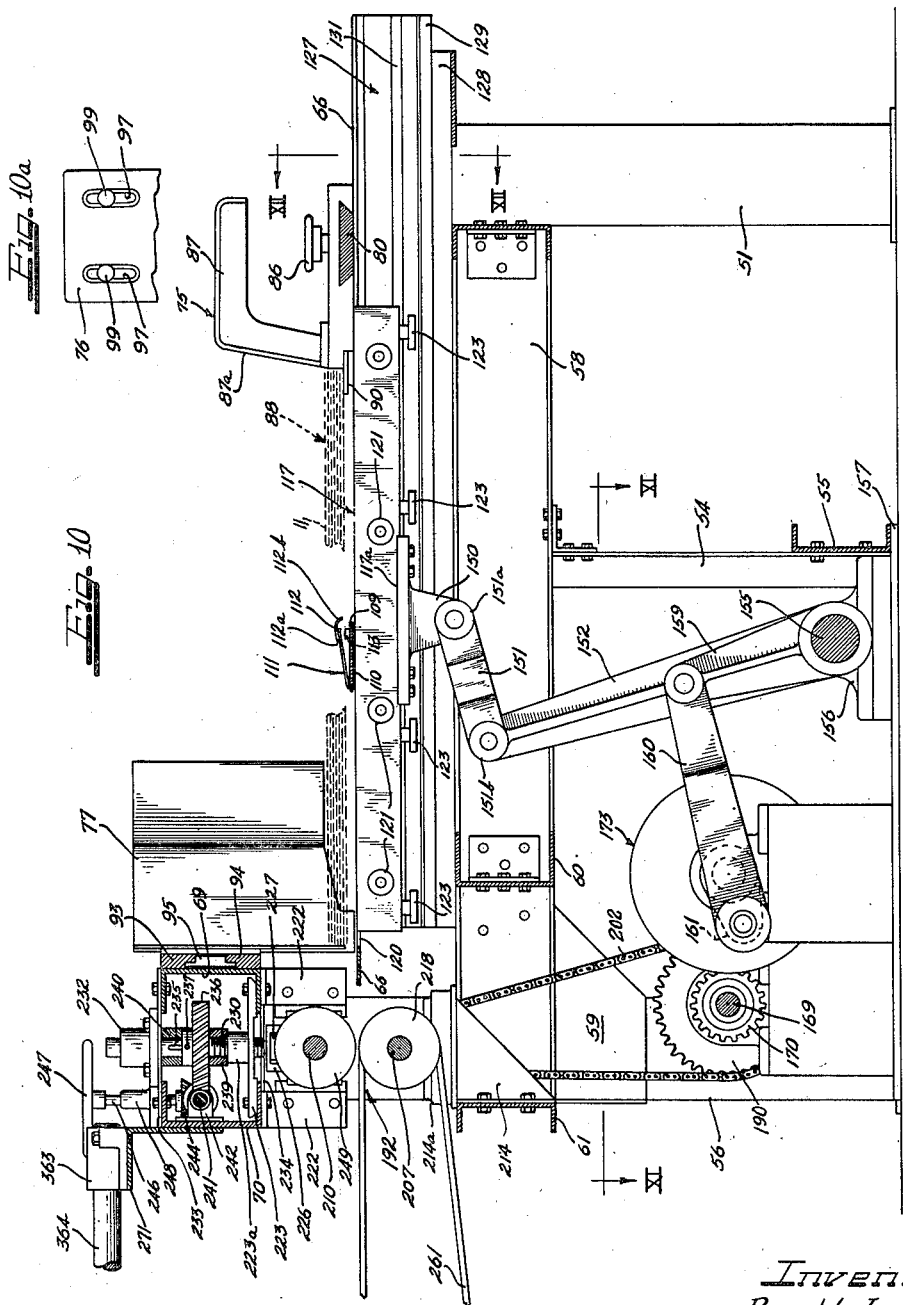

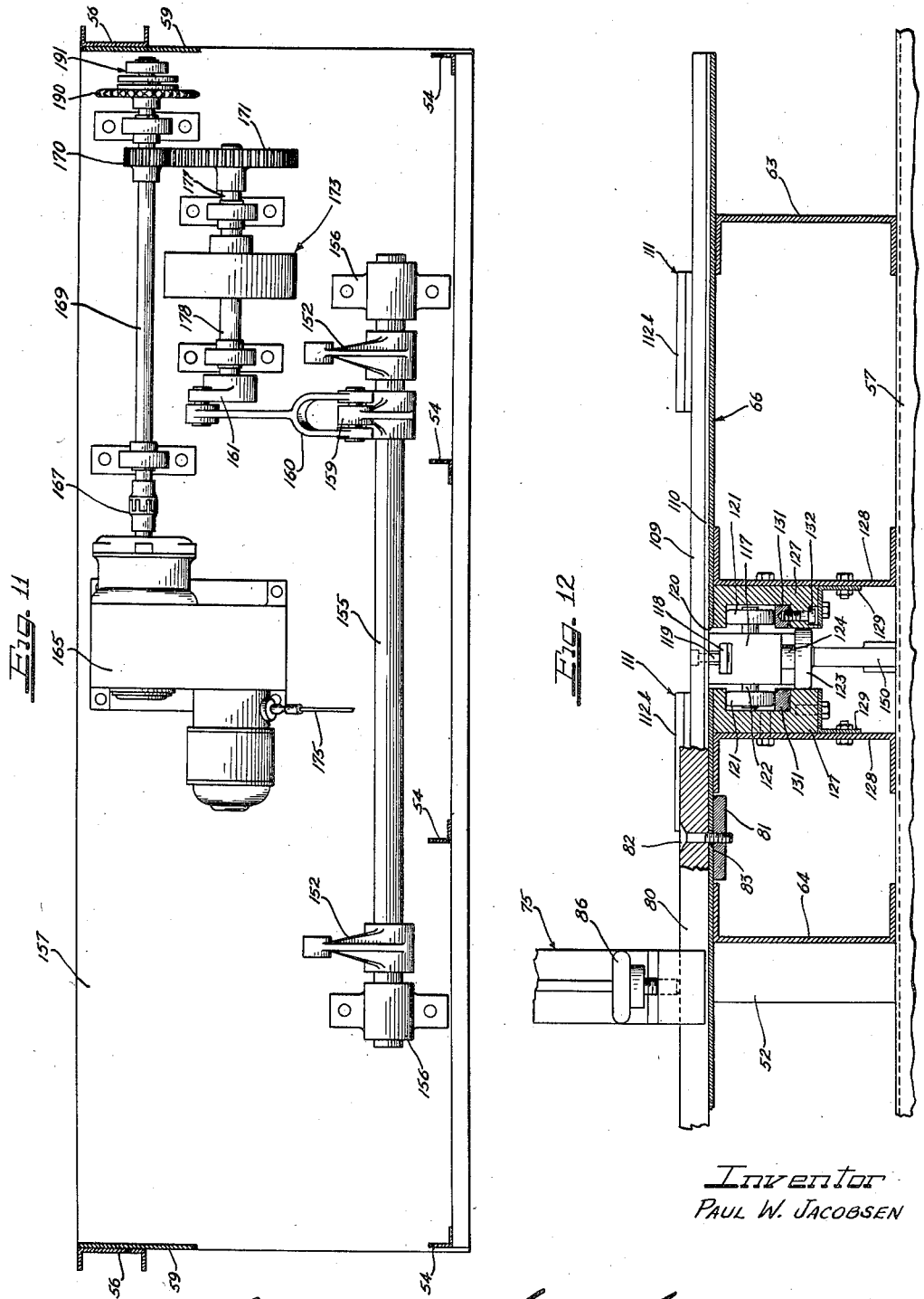
April 2, 1957  P. W. JACOBSEN  2,787,467
FEEDING AND TAKEOFF MECHANISM
Filed Sept. 8, 1953  17 Sheets-Sheet 7
Inventor
PAUL W. JACOBSEN

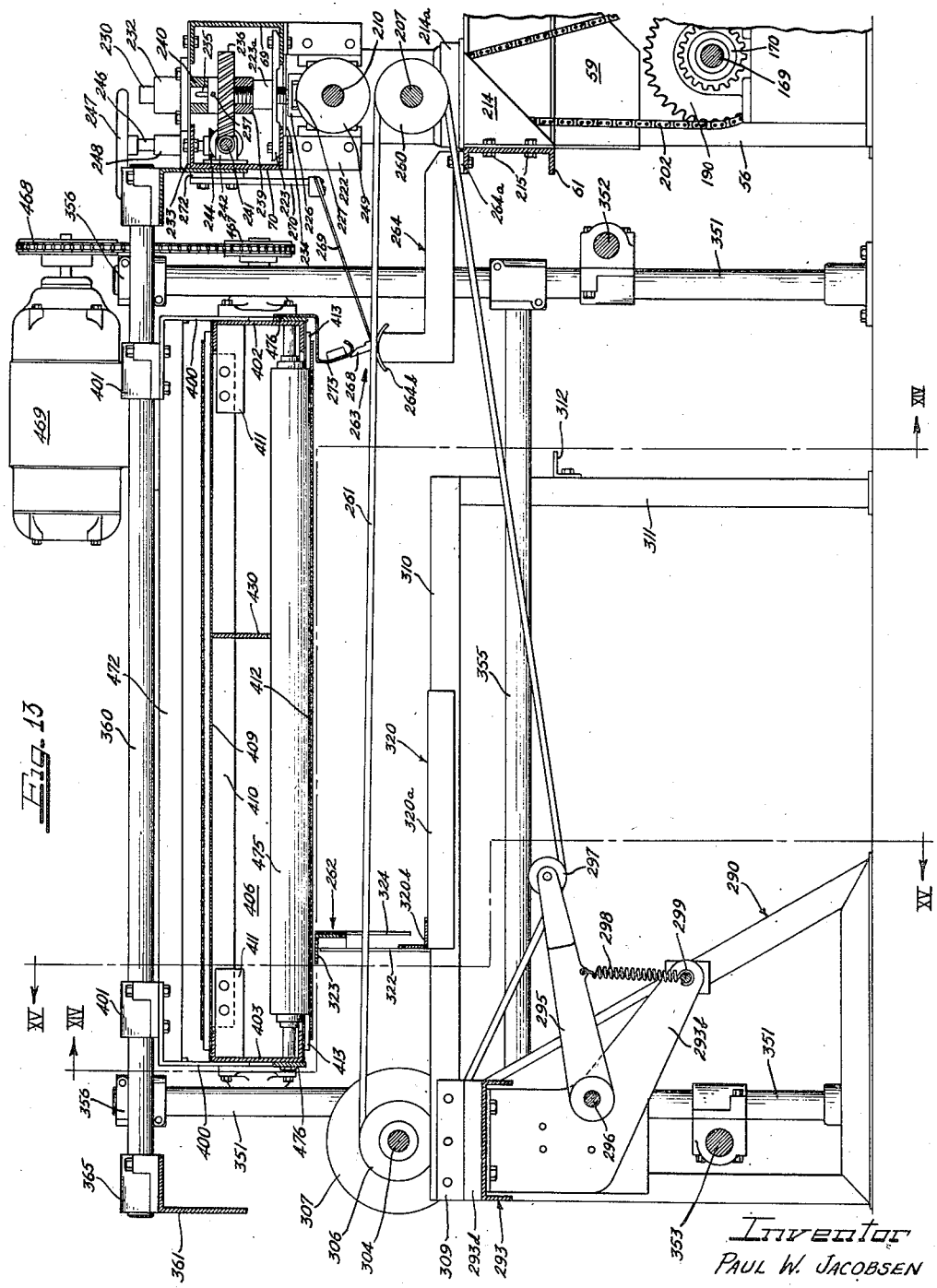

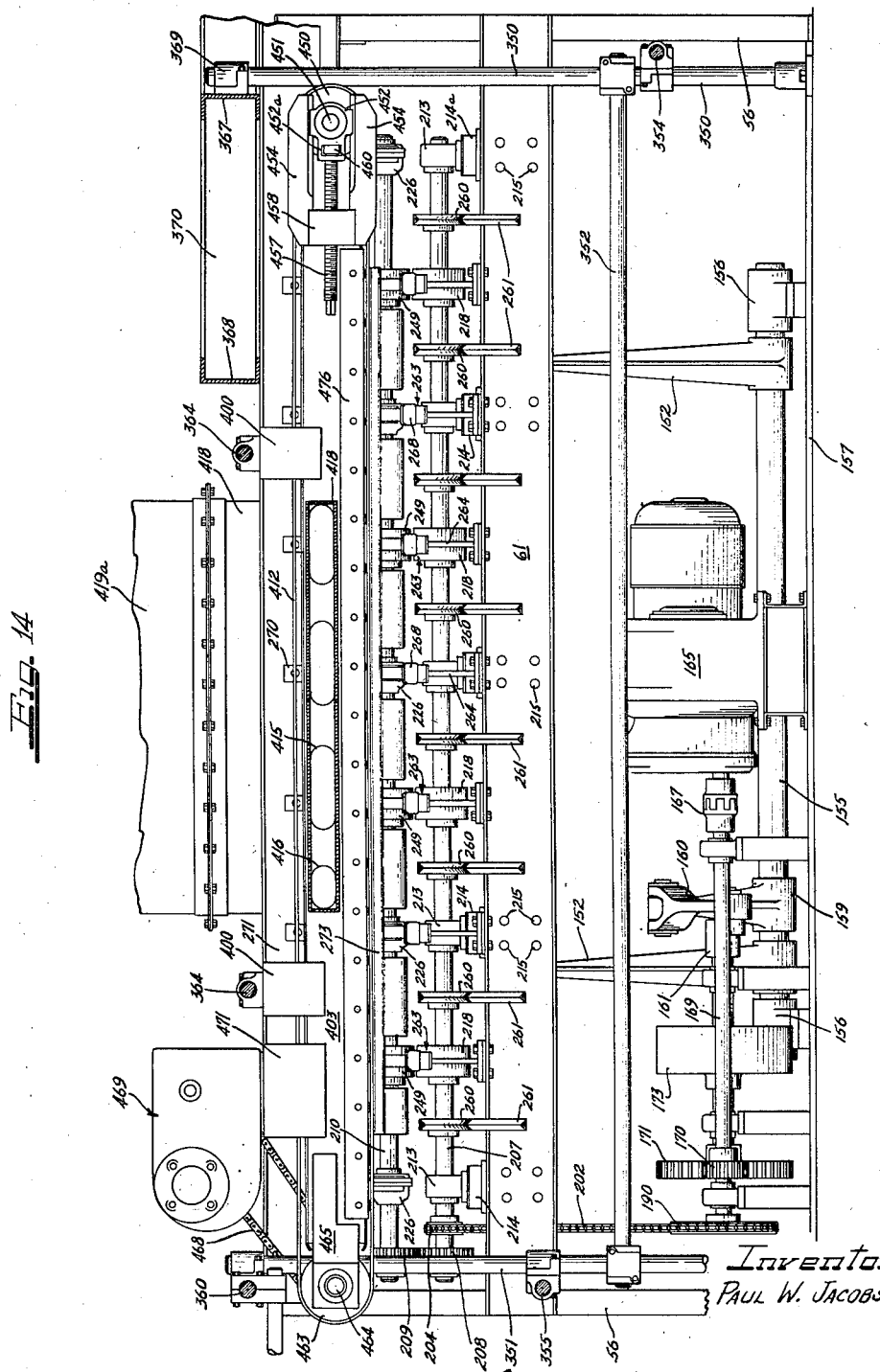

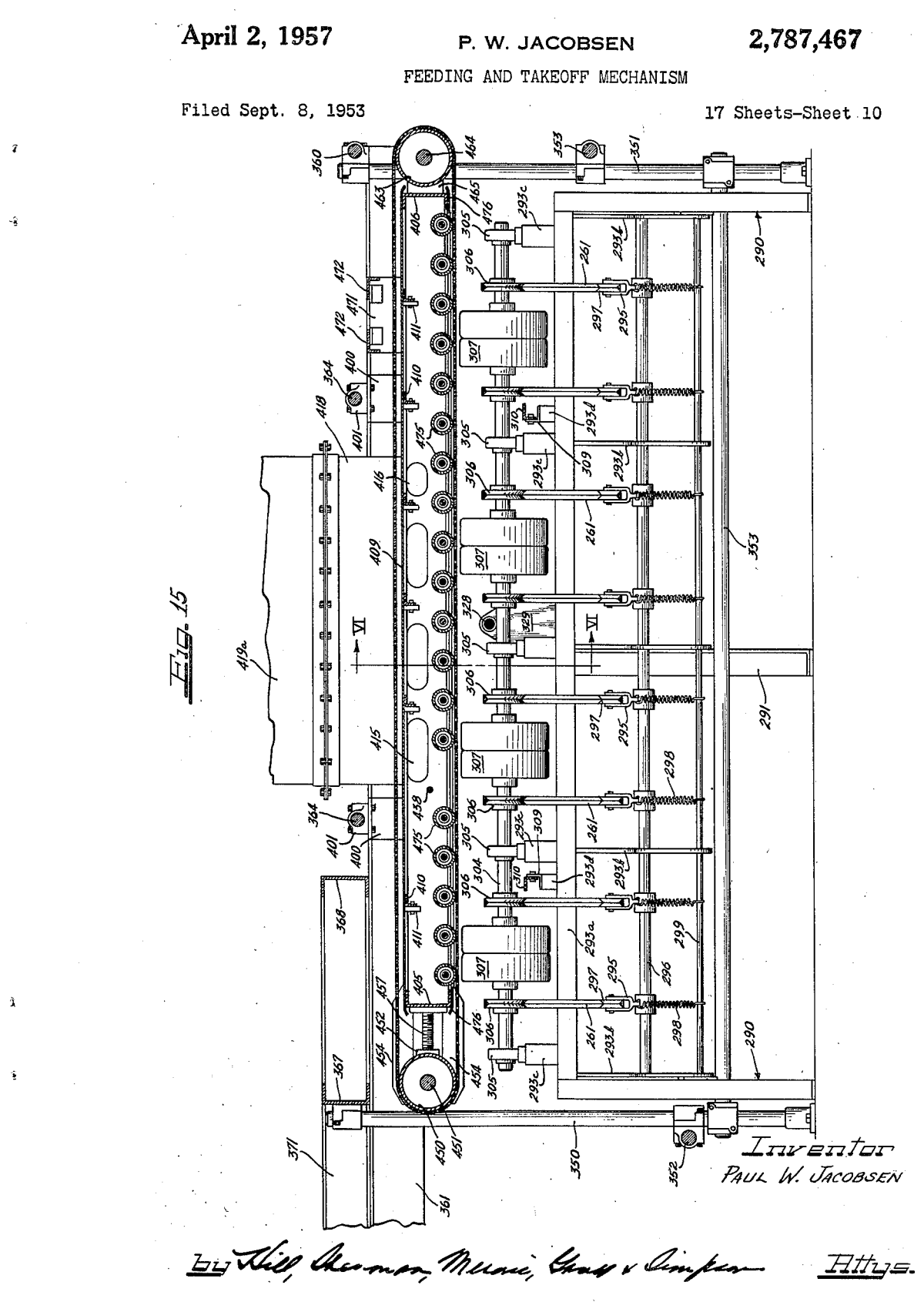

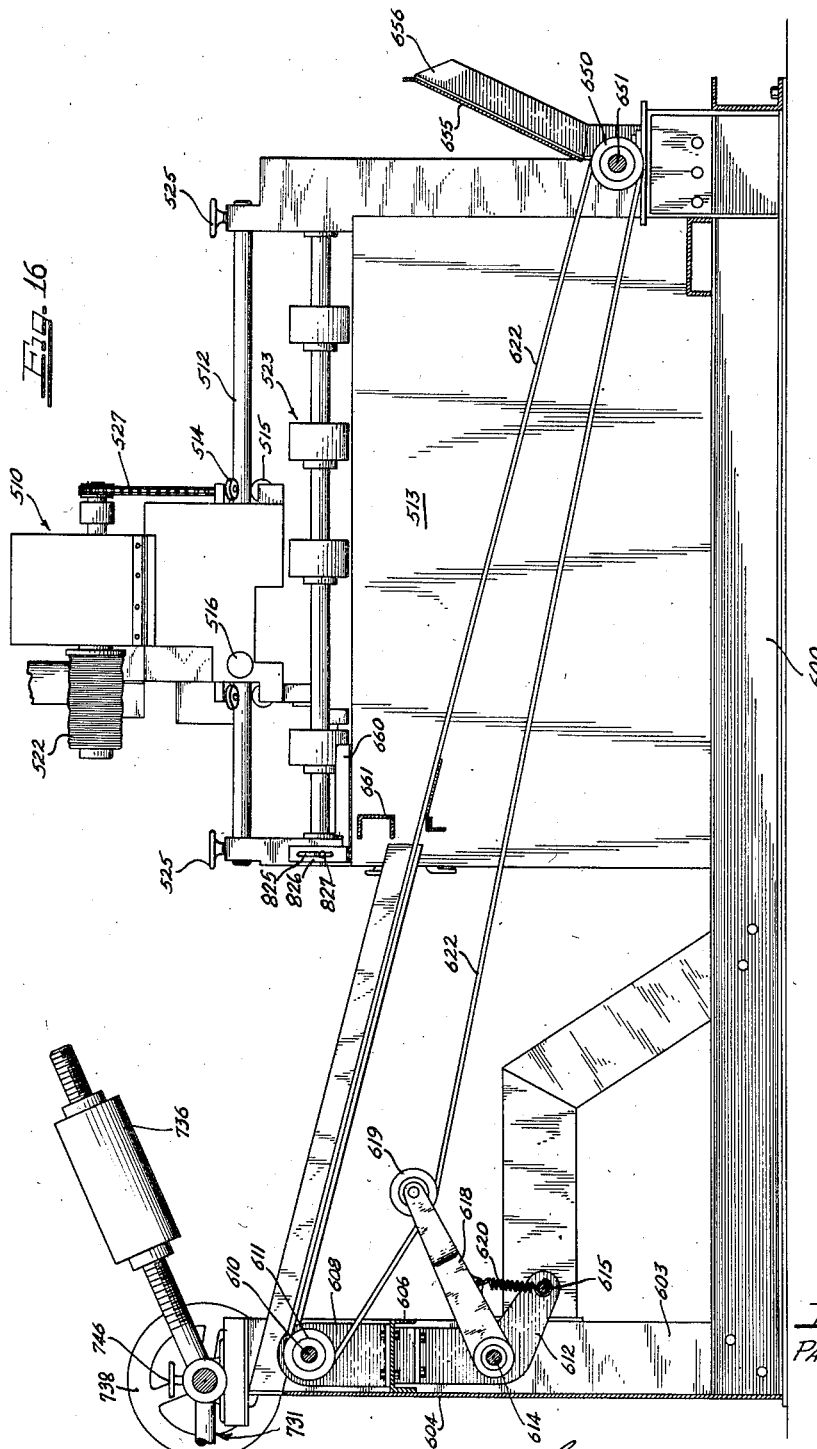

April 2, 1957  P. W. JACOBSEN  2,787,467
FEEDING AND TAKEOFF MECHANISM
Filed Sept. 8, 1953  17 Sheets-Sheet 12
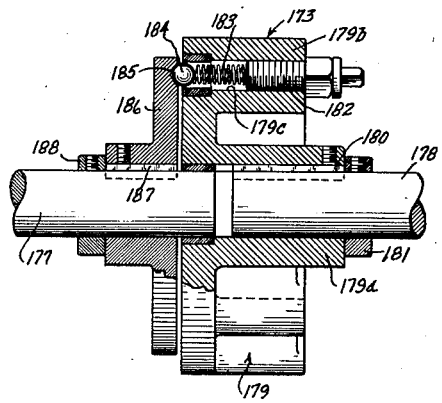
Fig. 17
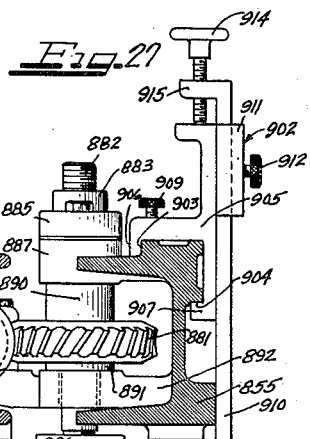
Fig. 27
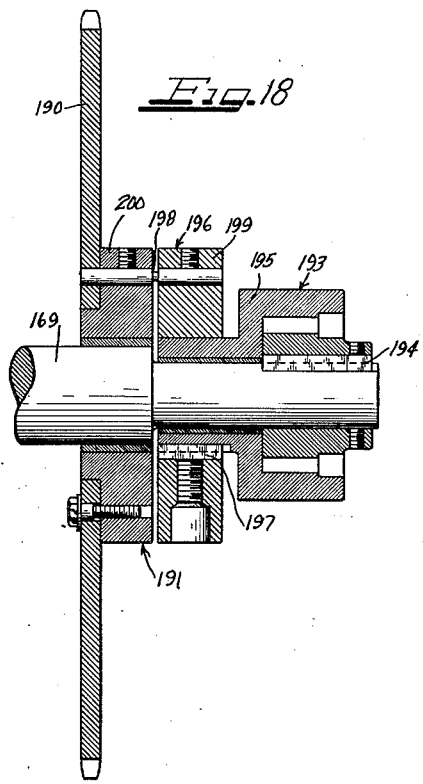
Fig. 18
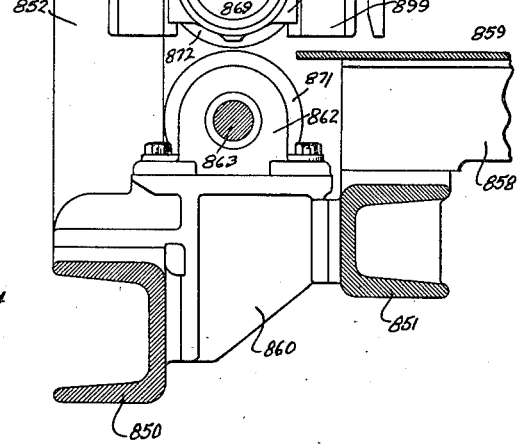
Inventor
PAUL W. JACOBSEN

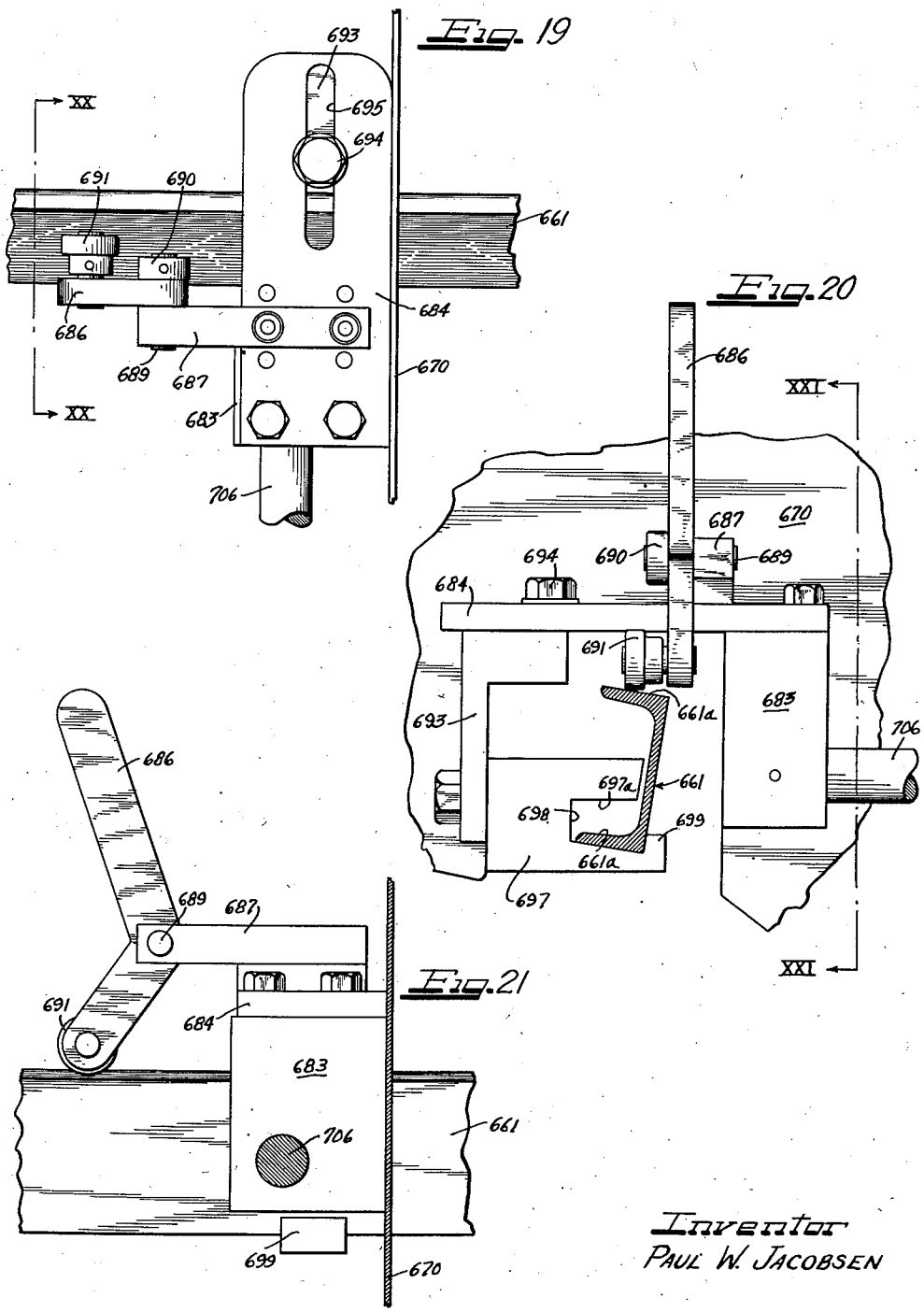

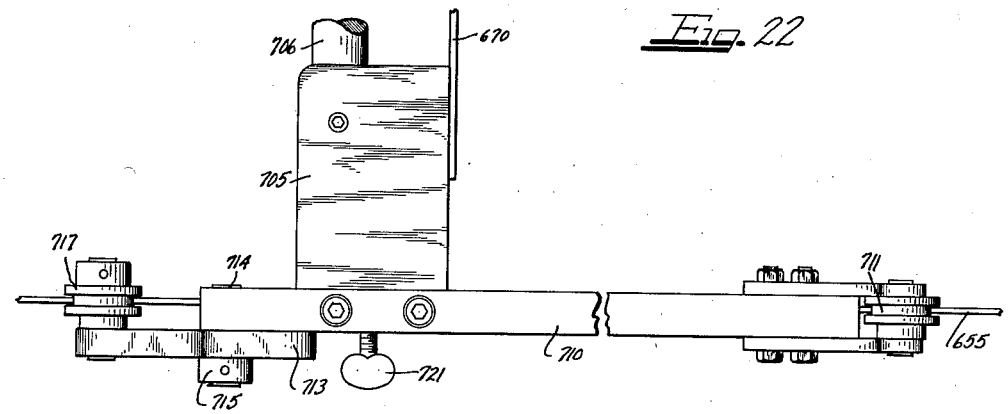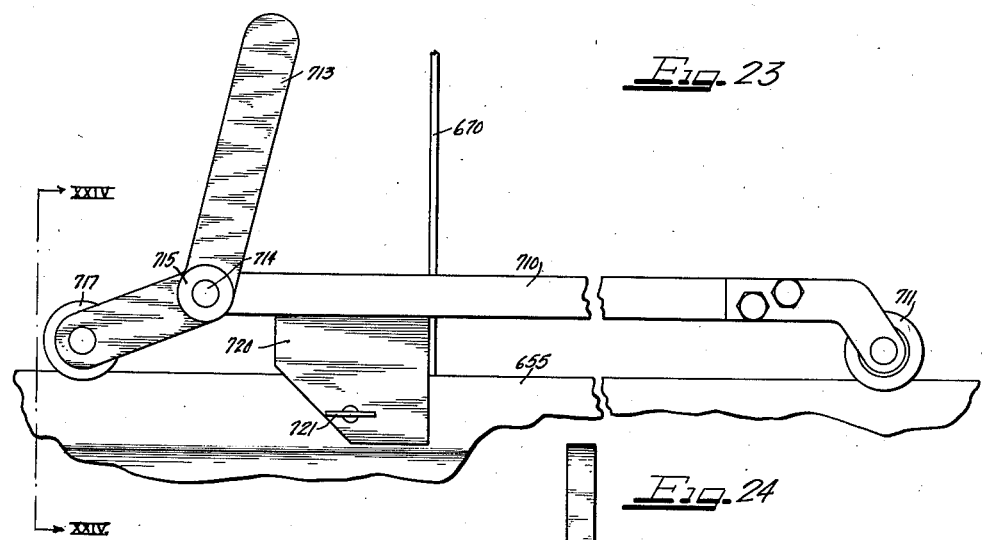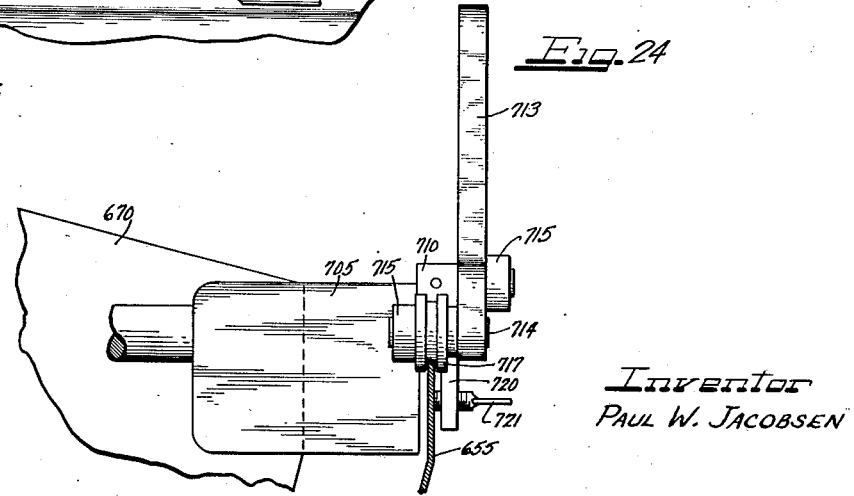

April 2, 1957  P. W. JACOBSEN  2,787,467
FEEDING AND TAKEOFF MECHANISM
Filed Sept. 8, 1953  17 Sheets-Sheet 15

Inventor
PAUL W. JACOBSEN

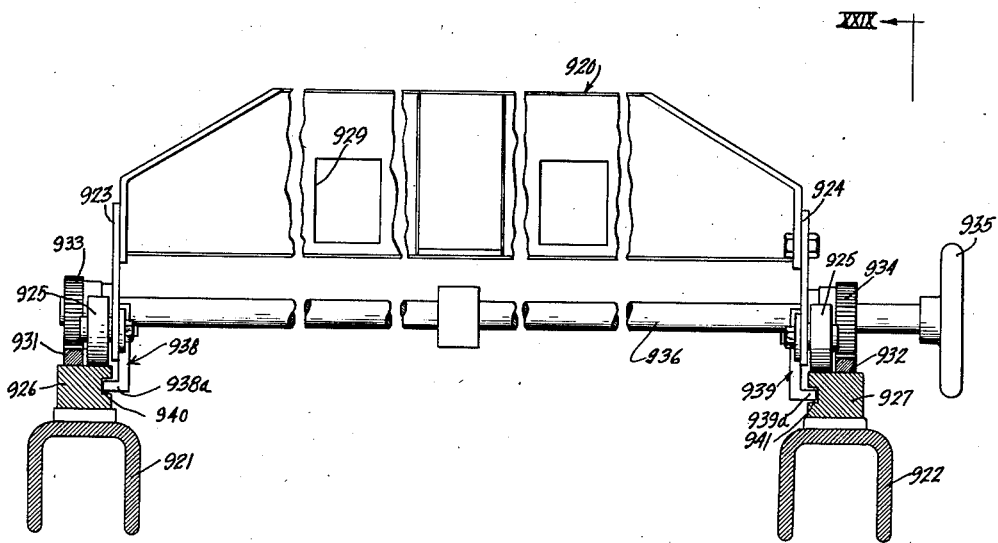

April 2, 1957  P. W. JACOBSEN  2,787,467
FEEDING AND TAKEOFF MECHANISM
Filed Sept. 8, 1953  17 Sheets-Sheet 17
Fig. 30
Fig. 31
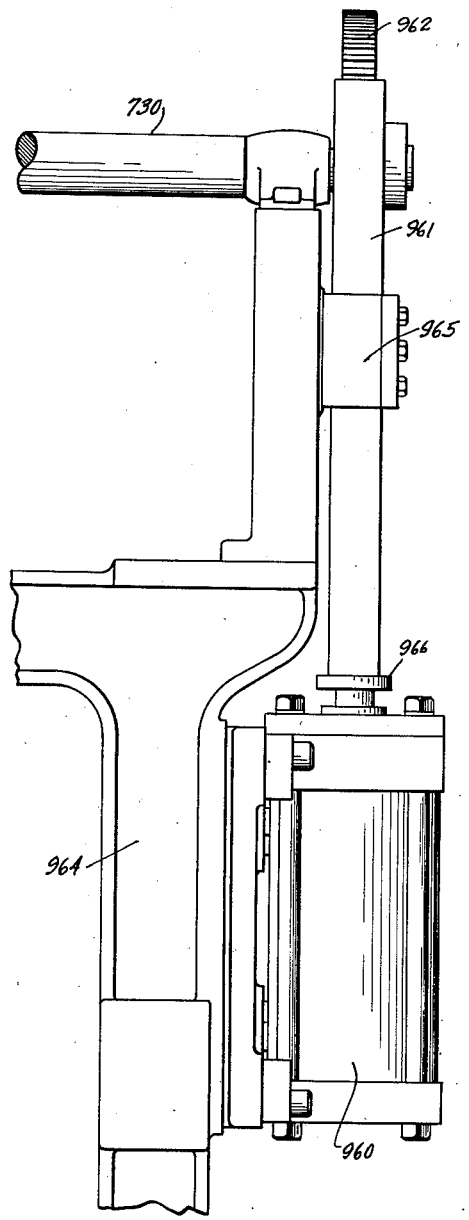
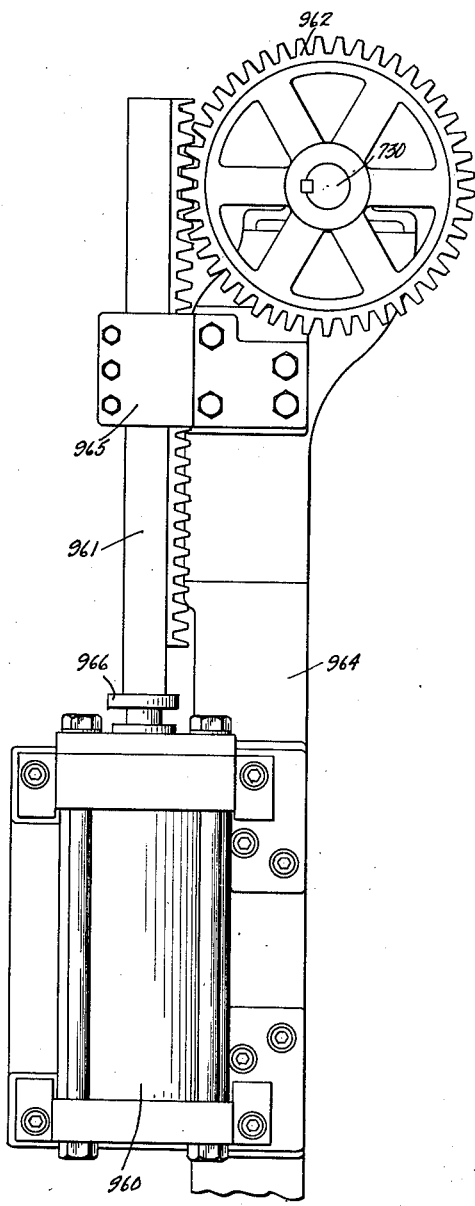
Inventor
PAUL W. JACOBSEN United States Patent Office 2,787,467
Patented Apr. 2, 1957

2,787,467

FEEDING AND TAKEOFF MECHANISM

Paul W. Jacobsen, Kiel, Wis., assignor to H. G. Weber and Co., Inc., Kiel, Wis., a corporation of Wisconsin Application September 8, 1953, Serial No. 378,843

9 Claims. (Cl. 271—4)

This invention relates to a feeding and take-off mechanism for sheet material, and particularly to a feeding and take-off mechanism for boxboard blanks.

In the manufacture of box-like containers, a relatively stiff material such as conventional boxboard is formed into flat sheets and scored and slotted so as to be capable of being folded into three-dimensioned containers. One form of boxboard blanks, for example, may be generally rectangular and have score lines extending between one pair of opposite edges of the blank with slots cut from the other pair of opposite edges inwardly to the score lines to form flaps pivotal relative to the body of the blank along the score lines.

Certain operations on such a blank may require the feeding of the blank through a work station in a direction parallel to the flap score lines, but transverse to the slots. An example, is the application of a tear strip to the blank in such a manner that when the blank is folded into a container, the tear strip may be pulled to separate the top portion of the container from the remainder thereof for convenient access to the contents. In such an operation, the tear strip may be distributed along the blank parallel to the flap score lines by moving the blank through the tear strip applicator mechanism.

The present invention is particularly adapted to the feeding of a stack of boxboard blanks to such a work station and for reforming the blanks into a stack after passing through the work station. Since in feeding blanks from a stack, the flaps of adjacent blanks may tend to interlock, the present invention particularly concerns a feeding mechanism for delivering the blanks from a stack in a direction parallel to the flaps to avoid such interlocking and for then delivering the blanks in a direction parallel to the flap score lines to a work station.

It is therefore an object of the present invention to provide a feeding mechanism for rapidly delivering boxboard blanks to a work station.

It is another object of the present invention to provide a novel feeding and take-off mechanism for boxboard blanks.

It is a further object of the present invention to provide a novel feeding mechanism for delivering boxboard blanks from a stack in a first direction and for thereafter directing said blanks for travel in a direction transverse to said first direction.

It is a still further object of the present invention to provide a novel take-off mechanism for receiving blanks moving in a first direction and for discharging said blanks in a direction transverse to said first direction.

It is another and further object of the present invention to provide a novel shuttle assembly and novel components therefor for delivering sheets from a stack.

It is still another and further object of the present invention to provide a novel shuttle assembly and novel components therefor for delivering sheets from a stack.

It is still another and further object of the present invention to provide a novel sheet suction conveyor and cooperating sheet stop assembly and novel components thereof for shifting the direction of travel of relatively stiff sheets.

It is yet another object of the present invention to provide a novel take-off assembly and components for shifting the movement of and stacking relatively stiff sheets.

It is a more specific object of the present invention to provide novel means for supporting and positioning a stack of sheets on a work table, and novel means for adjusting said positioning means for varying size sheets.

It is another more specific object of the present invention to provide a novel means for feeding sheets from a stack and for adjusting said feeding means to varying size sheets.

It is a further more specific object of the present invention to provide a novel reciprocal drive for delivering sheets from a stack.

It is still another more specific object of the present invention to provide a novel clutch assembly.

It is yet another more specific object of the present invention to provide a novel overload protection mechanism.

It is another and further more specific object of the present invention to provide a novel draw roll assembly and adjustment mechanism therefor.

It is a still further more specific object of the present invention to provide a novel sheet stop assembly and adjustment mechanism therefor.

It is another and still further more specific object of the present invention to provide a novel suction conveyor assembly and adjustment mechanism therefor.

It is yet another and further more specific object of the present invention to provide a novel stop assembly for a take-off conveyor and adjustment mechanism therefor.

A further more specific object of the present invention resides in the provision of a novel hopper assembly for stacking sheets and an adjustment mechanism therefor and in the provision of novel hopper raising means.

Other objects, features and advantages of the present invention will be readily apparent from the following detailed description of a preferred embodiment and certain modifications thereof taken in view of the accompanying drawings.

On the drawings:

Figure 1 is a diagrammatic plan view of a carton blank of boxboard material in flat sheet form, with a tear strip applied thereto;

Figure 2 is a diagrammatic perspective view of a contained partially formed from the boxboard blank of Figure 1 and with the tear strip end tab extending at the exterior of one side of the carton;

Figure 3 is a diagrammatic perspective view of a closed carton formed from the blank of Figure 1 and showing the manner in which the top portion of the carton is removed by means of the tear strip;

Figure 5 is a front elevational view of the feeding and take-off mechanism of Figure 4;

Figure 6 is a fragmentary vertical sectional view illustrating the shuttle sheet-positioning mechanism and the take-up end of the suction conveyor partially broken away and in section, the view being taken along the line VI—VI of Figure 15;

Figure 7 is a left side elevational view of the feeding and take-off mechanism of Figure 4;

Figure 10 is a vertical sectional view taken substantially along the line X—X of Figure 5;

Figure 10A is an enlarged fragmentary vertical sectional view of the sheet dam and end guide adjustment mechanism carried on the shuttle arch;

Figure 11 is a horizontal sectional view taken substantially along the line XI—XI of Figure 10;

Figure 12 is a fragmentary vertical sectional view illustrating the shuttle reciprocal feed mechanism of the embodiment of Figure 4, and taken along line XII—XII of Figure 10;

Figure 13 is a vertical sectional view taken substantially along the line XIII—XIII of Figure 4;

Figure 14 is a vertical sectional view taken substantially along the line XIV—XIV of Figure 13;

Figure 15 is a vertical sectional view taken substantially along the line XV—XV of Figure 13;

Figure 16 is a vertical sectional view taken substantially along the line XVI—XVI of Figure 4;

Figure 17 is a side elevational view of the clutch assembly of the shuttle drive with certain parts broken away and in section;

Figure 18 is a longitudinal sectional view of the overload protector assembly for the shuttle draw roll drive;

Figure 19 is a fragmentary top plan view illustrating the stop plate clamping mechanism on the drop-off channel of the take-off conveyor;

Figure 20 is a fragmentary vertical sectional view taken substantially along the line XX—XX of Figure 19, and showing the stop plate in raised position for adjustment along the drop-off channel;

Figure 21 is a fragmentary vertical sectional view taken substantially along the line XXI—XXI of Figure 20;

Figure 22 is a fragmentary top plan view illustrating the stop plate locking device on the back plate of the take-off conveyor;

Figure 23 is a fragmentary side elevational view of the structure of Figure 22;

Figure 24 is a fragmentary vertical sectional view taken substantially along the line XXIV—XXIV of Figure 23;

Figure 27 is a fragmentary vertical cross-sectional view of the structure of Figure 25, and additionally illustrating a modified sheet dam adjustment mechanism according to the present invention;

Figure 28 is a fragmentary vertical sectional view illustrating a modified shuttle stop plate adjustment mechanism according to the present invention;

Figure 29 is a fragmentary vertical sectional view taken substantially along the line XXIX—XXIX of Figure 28;

Figure 30 is a fragmentary side elevational view illustrating a modified hopper raising mechanism according to the present invention; and Figure 31 is a front elevational view of the structure of Figure 30.

Figure 4:
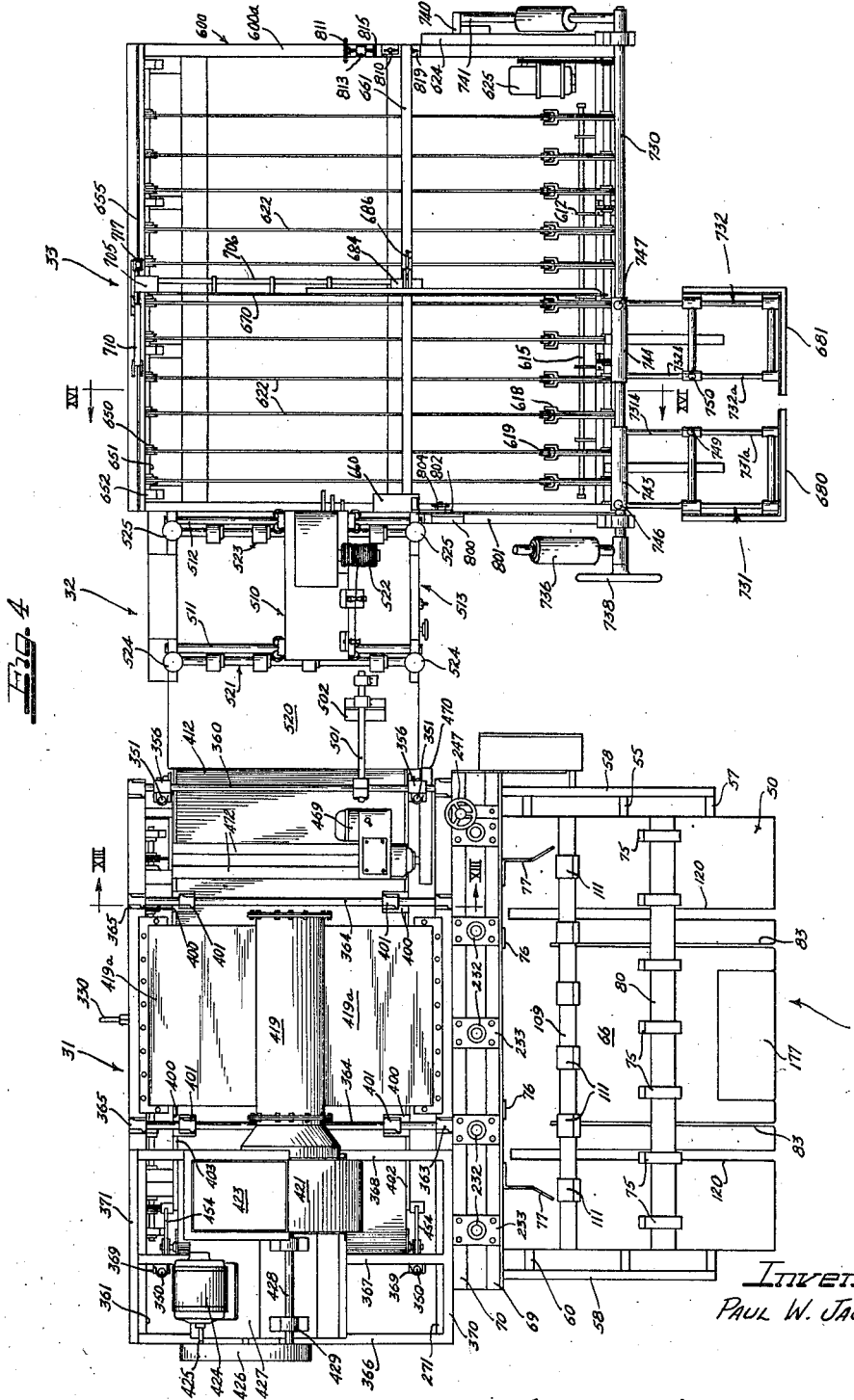
Figure 4 is a plan view of one embodiment of a feeding and take-off mechanism according to the present invention utilized in conjunction with a tear strip applying mechanism.

The feeding and take-off mechanism of the present invention has been utilized in conjunction with a tear strip applying mechanism for applying a tear strip to a boxboard blank and will be described in detail in this application by way of example.

As illustrated in Figures 1, 2 and 3, a tear strip 10 may be applied to a flat carton blank 11 which is adapted to be folded into a container 12. The blank may be of generally rectangular configuration and comprises side panels 13a–d connected on fold lines 14a–c, a plurality of top flaps 17a–d joined to the side panels along a score line 18, and a plurality of bottom flaps 20a–d joined to the side panels along a score line 21. As indicated in Figures 1 and 2, one end of the tear strip 10 extends around the free edge of the side panel 13a and is secured to the front side thereof to be exposed as indicated at 10a when the carton blank is folded and the free edges of the side panels 13a and 13d are joined by the tape joint 22. When it is desired to open the container, the tear strip end 10a is lifted away from the side panel 13a and then pulled in the manner indicated in Figure 3 to remove a portion of each side panel just below the top thereof to separate a top portion 24 of the container from the remainder thereof to provide access to the contents of the container.

The carton blank 11 is preferably of relatively rigid board material but adapted to be torn in the manner indicated by the tear strip 10. For example, the blank may be made of conventional boxboard. The term "boxboard" as used hereinafter in the specification and claims is intended to comprehend all materials of stiffness comparable to conventional boxboard.

In delivering the boxboard blanks 11 to the tear strip applicator mechanism, it is contemplated that the boxboard blanks will be placed in a stack and fed into the tear strip applicator from the bottom of the stack. According to the present invention, the blanks are fed into the machine transversely to the direction in which the blanks are to be moved through the tear strip applying mechanism proper or other treatment station. A number of advantages result from this manner of feed-in. For example, it has been found that snagging of the lowermost blank on the next blank above as the lowermost blank is fed into the machine is avoided since the flaps 17a–d and 20a–d of the blank will project parallel to the direction of feed into the machine. When blanks are fed into the machine from a stack in a direction transversely to the flaps, there is a tendency for the flaps of adjacent blanks to interlock and jam the feeding mechanism. A further advantage of feed-in parallel to the flaps is that where the blank is to travel through the treatment station in a direction transverse to the flaps, the blank is fed into the machine broadside so that a shorter feed-in stroke is required. This advantage obtains when the flaps are disposed on the longer side edges of the blank. By use of this broadside or lateral feed-in, a more compact machine is achieved particularly with respect to the overall length thereof.

The term "longitudinal" as used hereinafter in the specification and claims will refer to the direction in which the blank is fed through the treatment station, herein the tear strip applying mechanism proper. The term "lateral" shall refer to a direction transverse to the "longitudinal" direction.

The general lay-out of a machine for applying a tear strip 10 to a blank 11, together with the novel feed-in and take-off mechanism of the present invention is illustrated in Figure 4. The reference numeral 30 indicates the lateral feed-in station or shuttle where the blanks 11 are stacked for lateral delivery to a longitudinal transfer station or suction conveyor 31. The suction conveyor 31 directs the blanks longitudinally for movement through the tear strip applying mechanism proper indicated at 32, from whence the blanks are discharged to the lateral take-off conveyor 33.

Shuttle

The shuttle comprises a blank-supporting table 50 sustained by front corner legs 51, Figure 7, front center legs 52, Figure 5, middle legs 54, Figure 7, and rear legs 56. A reinforcement channel 55 extends between the middle legs 54 at the base of the machine, a front shuttle beam 57 extends across the front of the shuttle and is supported by the front legs, and end beams 58 extend along the sides of the shuttle and are supported by the rear legs by means of gusset plates 59. An intermediate shuttle beam 60, Figure 10, and a lower draw roll support beam 61 span between the end beams 58 as indicated in Figure 10. As seen in Figure 5, a pair of end shuttle deck plate support channels 63 and a pair of center deck plate support channels 64 are connected with the front corner legs 51 and front center legs 52 and extend across and on top of the front shuttle beam 57 and intermediate shuttle beam 60 to support the shuttle deck plate 66, Figure 4. A pair of channels 69 and 70 extend across the rear of the shuttle and above the deck plate 66 and are supported by the rear legs 56 to define the shuttle arch.

The stack of blanks to be disposed on the shuttle are positioned between a plurality of cradle members 75, Figure 4, sheet dam members 76 and end guides 77. As illustrated in Figures 10 and 12, the cradle members 75 are mounted upon a gib bar 80 extending across the front of the shuttle for positioning therealong by means of lock wheels 86. The gib bar 80 is itself adjustable in the front-rear direction along the shuttle deck plate 66 by means of clamp track slots 83, Figures 4 and 12, the gib bar 80 being locked in a selected position by means of screws 82 projecting through the slots 83 and engaging pinch plates 81 on the underside of the deck plate 66, Figure 12.

It will be observed from Figure 10 that the sheet cradles 75 have upper sections 87 of inverted L-shape providing sloping faces 87a for engaging the front edges of the sheets 11 of the stack 88. A ledge 90 projecting rearwardly from the face 87a on the sheet cradle 75 is provided for supporting the front edge of the stack 88 above the surface of the deck plate 66.

Referring further to Figure 10, it will be observed that the end guides 77 and sheet dam members 76 may be adjustable for different size stacks 88 by means of rail members 93 and 94 extending across the front of the shuttle arch channel 69 in conjunction with a pinch lug 95 slidable relative to the rail members and adapted to be clamped to one of the end guides or sheet dam members to position the same along the rail members. As indicated in Figure 10A, the sheet dams and end guides may be provided with vertically extending adjustment slots for vertical adjustment relative to the deck plate 66 by means of clamping screws 99 extending through the slots and engaging the pinch lugs 95. The adjustment slots are indicated diagrammatically at 97 in Figure 10A.

For feeding the bottom sheet of the stack 88 into the suction conveyor 31, a kick bar is slidably mounted on the deck plate 66 by means of a bearing plate 110, Figure 10, and carries kick plate 111 of spring steel with a curved plate portion 112 secured to the free end of the kick plate 111. The curved plate portion 112 provides an undercut leading edge 112a which may have a slope of 60° and be of height to engage only a single sheet of the stack as the kick bar 109 is moved rearwardly to a position behind the ledge 90 of the cradle 75. The curved trailing face 112b of the plate portion 112 prevents any snagging of the kick plate 111 with the sheets during the return movement of the kick bar in the rearward direction. It will be observed from Figure 4, that the kick plates 111 are staggered with respect to the cradles 75 across the shuttle so that the kick plates 111 move rearwardly between the cradles 75 to engage the front edge of the bottom sheet of the stack 88. Rubber stops 113, Figure 10, may be provided on the kick bar 109 to resist complete deflection of the kick plates 111 toward the kick bar 109.

For reciprocating the kick bar 109 in the fore-aft direction to deliver sheets into the machine, a carriage 117, Figure 12, is reciprocally mounted beneath the deck plate 66 on either side of the shuttle. Each carriage 117 is secured to the kick bar 109 by means of a gib key 118 extending within a slot in the carriage and screws 119 clamping the kick bar 109 to the gib key 118. As seen in Figures 4 and 12, the deck plate 66 is provided with slots 120 for accommodating the fore-aft reciprocation of the carriages 117. Referring to Figure 12, the carriage 117 carries rollers 121 on a horizontal shaft 122 and rollers 123 on vertical shafts 124. The carriages are guided by C-shaped track members 127 carried by channels 128 and support angles 129. Wear bars 131 are secured to the C-shaped members 127 by means of screws 132 for supporting the rollers 121.

As best seen in Figure 10, the shuttle drive for reciprocating the carriages 117 and delivering the sheets from the stack 88 into the machine is connected with pivot clamps 150 one depending from each of the carriages 117. The linkage for reciprocating each carriage 117 in the tracks 127 includes an upper link 151 having a bifurcated end 151a pivotally secured to clamp 150 and an opposite bifurcated end 151b pivotally connected to the oscillating arm 152. The oscillating arm 152 is mounted on a rocker shaft 155 carried by journals 156 on the base plate 157 of the shuttle drive. An oscillating drive arm 159 is connected at its lower end to the rocker shaft 155 and at its upper end is connected with a lower drive link 160 which in turn is driven by means of a crank 161 to oscillate the arm 152 about the rocker shaft 155. As best seen in Figure 11, a motor 165 drives the crank 161 through a gear coupling 167, a shaft 169, spur gears 170 and 171 and a clutch 173. A speed control shaft 175 extends from the motor 165 to the front of the machine as indicated in Figure 7 and is provided with a knob 176 for controlling the speed of the shuttle drive and consequently the rate of delivery of sheets into the machine.

The details of the clutch 173 affording the driving connection between the shafts 177 and 178 are shown in Figure 17. The clutch drive member 179 comprises a hub portion 179a affixed to the shaft 178 by means of a key 180 and a collar 181, and an outer coupling portion 179b having a plurality of axial recesses 179c extending therethrough. Studs 182 are threaded into the recesses 179c to bottom springs 183, which in turn urge ball members 184 into engagement with recesses 185 in the driven clutch member 186 which is affixed to the shaft 177 by means of a key 187 and collar 188. The clutch 173 allows the drive train including the motor 165 to overrun, should the sheet feed mechanism become jammed or the like.

Referring to Figure 11, it will be observed that the drive shaft 169 is also connected to a sprocket 190 through an overload protector 191 shown in detail in Figure 18. The sprocket 190 drives the shuttle draw rolls indicated generally at 192 in Figure 10. Referring to Figure 18, it will be observed that the shaft 169 is connected with a conventional overrunning clutch assembly indicated diagrammatically at 193 by means of a key 194, and that the driven member 195 of the clutch 193 is connected with a shear pin assembly 196 by a key 197. The shear pin 198 is adapted to disconnect the member 199 of the shear pin assembly 196 from the member 200 and the sprocket 190 when the sprocket 190 is held against rotation relative to the drive shaft 169. On the other hand, when the drive shaft 169 is braked, the overrunning clutch assembly 193 allows the sprocket 190 to continue to turn to clear the draw rolls of sheets which have already been delivered thereto or which are delivered thereto by the shuttle after the braking has been applied. A solenoid brake may be used with the illustrated drive for braking the shuttle within one-half of a stroke thereof.

Referring to Figure 14, it will be observed that the sprocket 204 on the shuttle lower draw roll shaft 207 is driven from the sprocket 190 by means of the chain 202. It will further be observed that the lower draw roll shaft 207 carries a spur gear 208 meshing with a spur gear 209 on the upper draw roll shaft 210 for driving the upper draw roll shaft 210 with the lower draw roll shaft 207. It will be observed that the draw roll assembly is driven in synchronization with the shuttle feed mechanism since both are driven from the same shaft 169 by the motor 165.

The lower draw roll shaft 207 is supported from the lower draw roll support beam 61 by means of saddles 214, Figure 10, saddle blocks 214a and bearing mountings 213, Figure 14. The saddles 214 are secured to the channel 61 by means of bolts 215 as indicated in Figure 14. The lower draw rolls 218 are spaced along the shaft 207 and may have a rubber covering for good frictional contact with the sheets being fed therethrough.

The upper draw roll shaft 210 is journaled by means of bearing blocks 226, Figure 10, which are vertically slidably mounted by means of bearing guide supports 222 carried by the shuttle arch beams 69 and 70. Vertical adjustment of the bearings 226 in the guide supports 222 is obtained by means of an adjustment screw 230 threaded through an adjustment boss 223 carried by the shuttle arch beams 69 and 70. The adjustment screw 230 engages a lock collar 227 rotatably disposed in a recess in the bearing block 226 whereby the adjustment screw 230 may be rotated relative to the bearing block 226 but is effective to raise and lower the bearing block therewith. A worm gear 236 is slidably mounted on the adjustment screw 230 but is held against rotation relative thereto by means of a slot 235 in the adjustment screw 230 and a pin 237 carried by the gear 236. Collars 239 and 240 position the gear 236 in spaced relation within the shuttle arch. A bearing 232 is mounted on the top of the shuttle arch channels 69 and 70 by means of a tie plate 233 for guiding the upper end of the adjustment screw 230.

For simultaneously adjusting the vertical position of the upper draw rolls 249 relative to the lower draw rolls 218, a worm shaft 241 extends along the length of the shuttle arch for rotation in journals 242 and has worm portions meshing with the worm gears 236 associated with each upper draw roll bearing block 226. For rotating the worm shaft 241, a bevel gear may be affixed at one end thereof for turning by a bevel gear 244 on a vertical shaft 246 having a hand wheel 247 at the upper end thereof, the shaft being journaled in a bearing 248.

Also carried on the lower draw roll shaft 207 are a plurality of shuttle transfer rope pulleys 260 having transfer ropes 261 trained therearound for carrying the sheets fed from the shuttle into the suction conveyor station 31. The sheets are halted in their lateral travel into the suction conveyor by means of a sheet stop assembly 262 and are prevented from rebound by a sheet-positioning device 263. The sheet-positioning device 263 comprises a spring member 269 of spring steel mounted by means of a support 270 and spacer 272 from the shuttle arch channel 70. The spring member 269 carries a stop pad 268 at its free end for engaging the front edges of the sheets as they rebound from the sheet stop assembly 262. A rebound stop bracket 273 depending from the suction conveyor cooperates with the stop pad 268 in preventing rebound. Spring stop rests 264 are mounted on the lower draw roll support channel 61 for supporting the spring members 269.

For supporting the transfer ropes 261 at the rear of the machine, the shuttle back stand includes frame members 290 supporting a bearing stringer 293, Figure 13. The stringer comprises a generally horizontal channel 293a having a plurality of depending support bracket members 293b mounting take-up idler arms 295 on pivot shaft 296 and biasing said arms by means of springs 298 secured to a spring support shaft 299. The idler pulleys 297 carried by the take-up idler arms 295 serve to tension the transfer ropes 261. The transfer ropes also extend over pulleys 306 carried on a back stand idler shaft 304 mounted by journals 305. As indicated in Figure 6, the journals 305 rest on mounting bosses 293c of the bearing stringer 293. Flywheels 307 on the shaft 304 at the shuttle back stand tend to maintain the rotation of the idler pulleys 306 relatively constant during operation of the machine.

It will be noted from Figure 13, that the idler pulleys 297 on arms 295 provide starting cushion and clutch action to overcome the inertia of flywheels 307 as well as to maintain belt tension when the machine is in operation. However, when the machine is shut down, the flywheels 307 receive no clutch action because the flywheels pull against the tight sides of the transfer ropes 261, keeping the shuttle draw rolls 218 and 249 in motion until the momentum of the flywheels 307 has been dissipated.

Figure 9:
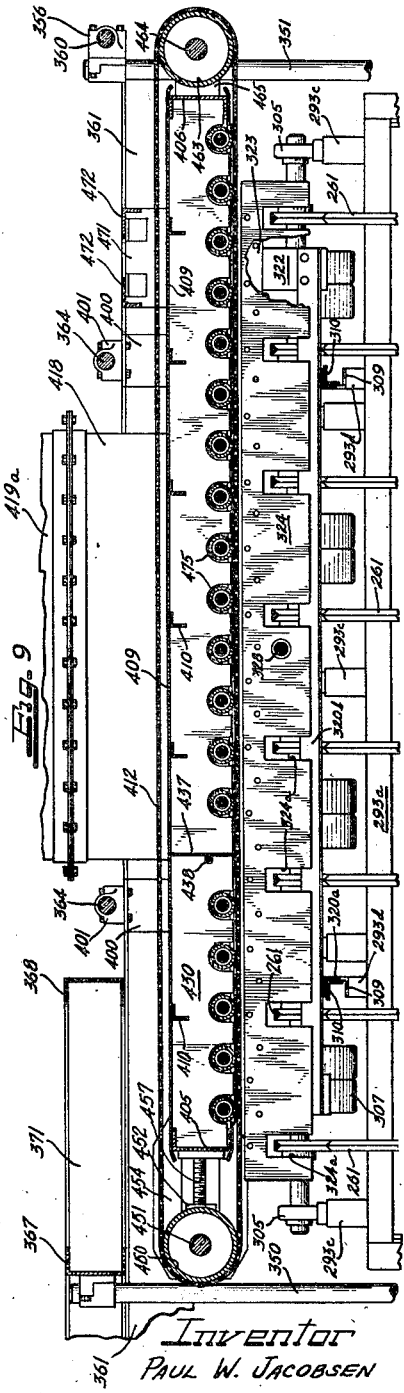
Figure 9 is a vertical sectional view taken substantially along the line IX—IX of Figure 6.

For adjusting the position of the sheet stop mechanism 262, slideways 310, Figure 13, are provided supported at the rear by means of clips 309 secured to bosses 293d of the bearing stringer 293. At the front end, the slideways 310 are supported by support legs 311. A cross piece 312 rigidifies the front framework including the legs 311. The sheet stop mechanism 262 has a slide support 320 riding on the slideways 310 and including angle irons 320a and a cross angle iron 320b. A sheet stop plate 324 is mounted on the slide support 320 by means of lugs 322 and a mounting bar 323. One lug 322 has a threaded boss 327 threadedly engaging an adjustment screw 328 for adjusting the fore-aft position of the stop plate 324. As indicated in Figure 9, the stop plate 324 is provided with rectangular notches 324a accommodating the transfer ropes 261. The adjustment screw 328 is supported from the stringer 293 by means of a support plate 329, and a crank 330 is secured to the rear end of the adjustment screw for turning the same to position the stop plate 324, collars 331 and 332 positioning the crew 328 relative to the support plate 329.

As a safety feature, suitable limit switches may be installed in the machine for detecting maloperation thereof. For example, a normally closed cut-out limit switch is disposed under the suction conveyor and is designed to open should box blanks jam up between the top of the transfer belts 261 and the underside of the suction conveyor 412, Figure 6. When a jam-up occurs, it causes the transfer belts to deflect which in turn trips the cut-out limit switch (not shown) located directly underneath one of the transfer belts 261. This limit switch is desirable since the area under the suction conveyor is obscured from the operator's vision. The limit switch may shut down the entire machine, and may be designed so that the machine cannot resume operation until the jam-up has been removed and the transfer belts are in operating position.

*Suction conveyor*

As indicated in Figure 7, the suction conveyor is supported by front upright frame members 350, rear frame members 351, front lower frame members 352, rear lower frame members 353 and transverse frame members 354 and 355. As seen in Figure 4, and as indicated in Figures 14 and 15, upper frame members 367, 368, 360, and 364 extend between the longitudinal front channel 271 and rear side frame 361. A further transverse channel 366 extends parallel to the channels 367 and 368 as indicated in Figure 4 and the three cross channels are connected by longitudinal channels 370 and 371 to provide a framework for supporting the suction motor 424 and blower 421, Figure 4.

As the sheets travel into the suction conveyor section of the machine on the transfer belts 261, a suction conveyor 412, Figure 13, sucks the sheets upwardly into engagement therewith for longitudinal transfer to the tear strip applicator mechanism. For providing the required suction, a suction box is disposed within the conveyor and comprises a pair of side frames 402 and 403 suspended by straps 400 from brackets 401 carried by the framework. The ends of the suction box are closed by means of end frames 405 and 406 and the suction box is provided with a cover 409 provided with braces 410 secured to brackets 411 carried by the side frames 402 and 403. The perforated suction conveyor belt 412 serves to close the lower end of the suction box. The suction box is preferably substantially air-tight so that the majority of air is sucked into the box through the lower reach of the conveyor belt 412.

For exhausting the suction box, the side frames 402 and 403 are provided with exhaust openings 415 and 416 connecting with exhaust ducts 418, Figures 6 and 15, which ducts, in turn, connect with the exhaust manifold 419, Figure 5, having exhaust manifold ducts 419a. A suction blower 421 connects with the exhaust manifold 419 for exhausting air therefrom and is supported on legs 422 from the framework previously described. The blower outlet 423 is indicated in Figure 4. The blower is driven from the motor 424 through shaft 425, a belt (not shown) covered by belt guard 426, and shaft 428 in journals 429.

When the machine is used with the smaller size sheets, it is desirable to increase the suction at the forward end of the suction conveyor so as to retain the smaller sheets with the conveyor as the leading end of the sheets is delivered into the tape-applying mechanism. To this end, the suction box is provided with a splitter plate 430 disposed at the forward side of the suction box and extending the length thereof as indicated in Figure 9. Additionally, the front and rear dampers 434 and 435 in the exhaust ducts 419a, Figure 7, may be adjusted to apply full suction to the front portion of the suction box and to apply only sufficient suction to the rear portion of the suction box as to prevent sagging of the conveyor belt 412. For further accommodating relatively small sheets, a cross damper 437 is provided at the front of the suction box having an operating rod 438, Figure 9, operated by a handle (not shown). By this expedient, the suction may be concentrated at the right or discharge end of the suction box for most efficient control of small sheets, as they are discharged from the suction conveyor and before they come under the control of the feed rolls 521, Figure 4, of the tape applying mechanism.

At the front end of the suction conveyor, the belt 412 extends around a roller 450 supported on a shaft 451 which, in turn, is journaled in bearing blocks 452. The bearing blocks 452 are slidable in ways 454 under the control of an adjustment screw 457 threadedly engaged in a nut casting 458 carried with the ways on the suction box side frames 402 and 403, respectively. The adjustment screw 457 is rotatably connected with the bearing block 452 as indicated in Figure 14 by means of a collar 460 in a recess in the bearing block so that the collar is free to turn but is held against lengthwise displacement from the recess. The rear roller 463 for the conveyor belt 412 is carried by a shaft 464 journaled in brackets 465 carried by each of the conveyor side frames 402 and 403. As indicated in Figure 13, a sprocket 467 is carried on the rear roller shaft 464 and drives the same from a motor 469 by means of chain 468, the chain being normally covered by a chain guard 470, as indicated in Figure 4. The mounting for the motor 469 is provided by means of brackets 471 and angle iron 472, as indicated in Figure 15. Referring to Figure 15, it will be observed that the lower reach of the suction conveyor belt 412 is guided across the lower part of the suction box by means of a plurality of idler rollers 475.

It should be especially noted that in the operation of the suction conveyor transfer station, sheets may be fed from the shuttle into the suction transfer station at a greatly increased rate since a first sheet need not be discharged from the station before a second sheet can be accommodated therein. In other words, as a first sheet enters the suction transfer station, it is raised off the transfer belt and into engagement with the suction conveyor belt, thereby immediately freeing the transfer belt for delivery of a second sheet underneath the first sheet before the first sheet has been completely discharged by the suction conveyor. As a result, sheets can be accommodated by the suction conveyor one immediately behind the other, in closely spaced relation.

The speed control shaft 175, Figure 7, is operative to vary the rate of delivery of sheets to the suction conveyor, and thus to control the spacing between sheets on the suction conveyor. The range of control is from overlapping to any desired gap dimension between successive sheets.

*Tear strip applying mechanism*

The tear strip applying mechanism per se forms no part of the present invention, and certain parts thereof have been illustrated merely by way of example, there being no intention to limit the feeding and take-off mechanism of the present invention to use with a tear strip applying mechanism since many other applications of the invention will be apparent to those skilled in the art.

As seen in Figure 4, a bar 501 may mount a number of micro switches indicated at 502 for initiating various actions of the tear strip applying mechanism 510 as a sheet approaches the same. The tape-applying mechanism 510 may be adjustable laterally of the path of movement of the sheets by means of a pair of mounting bars 511 and 512 on which the mechanism 510 may roll by means of rollers 514 and 515. A set screw such as 516, Figure 16, may be provided for fixing the position of the tape-applying mechanism relative to the path of the sheets through the station.

The tape-applying station may have a deck plate 520, Figure 4, and may be provided with feed rollers 521 for receiving the sheets from the suction conveyor station and for delivering them into the tape-applying mechanism proper indicated at 510. By way of example, the mechanism 510 may include a tape supply roll 522 and means including a chain 527 for driving the same, Figure 16. The tape-applying station may also be provided with discharge rollers 523, the feed and discharge rollers being provided with pressure adjustment hand wheels 524 and 525, respectively.

*Take-off mechanism*

Figure 8:
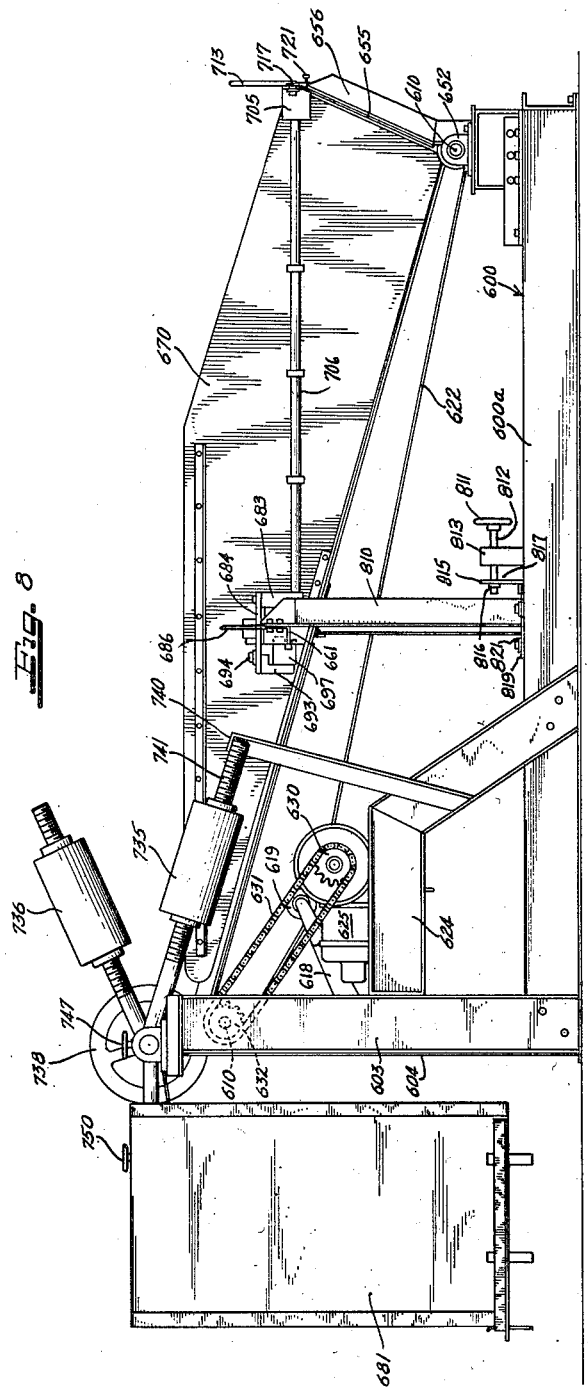
Figure 8 is a right side elevational view of the feeding and take-off mechanism of Figure 4.

Referring to Figures 4, 8, and 16, it will be observed that the take-off mechanism has a generally rectangular base framework 600 and includes front uprights 603 supporting a front plate 604. A front bearing channel 606 extends horizontally between the front uprights 603 and supports a plurality of bearing brackets 608 which carry a pulley drive shaft 610 and drive pulleys 611. Depending from the front bearing channel 606 at spaced intervals are shaft brackets 612 supporting an idler shaft 614 and a spring support shaft 615. Idler tensioning arms 618 are pivotally carried on the shaft 614 and mount idler pulleys 619 at their free ends, springs 620 extending between the shaft 615 and the arms 618 serving to tension the take-off ropes 622 trained around the pulleys 619 and 611.

As seen in Figure 8, side frame member 624 serves to support the motor 625 which drives shaft 610 through sprocket 630, chain 631, and sprocket 632 on shaft 610.

At the rear of the take-off mechanism, idler pulleys 650 are mounted on a shaft 651 journaled in bearings 652 supported from the base frame, Figure 4. As seen in Figure 16, a back plate 655 slopes somewhat rearwardly and upwardly from the transfer ropes 622 and is supported by back frame members 656. As sheets are delivered from the discharge rollers 523, Figure 16, the front edge of the sheets is deflected by the deflector 660 onto the boxboard drop-off channel 661. When the sheet has completely moved through the discharge rollers 523, the sheet is free to drop from the channel 661 onto the take-off ropes 622. As seen in Figures 4 and 8, a boxboard stop plate 670 is positioned to position the sheets on the transfer ropes for even stacking at the front of the take-off mechanism. The stop plate 670 is adjusted longitudinally along the drop-off channel 661 and the top edge of the back plate 655 in a manner illustrated in detail in Figures 21 through 26. The stop plate 670 is shown in Figure 4 in a position for guiding relatively small sheets and for causing the same to be stacked between the stacking cages 680 and 681 at the front of the machine.

Referring first to Figures 19 through 21, it will be observed that the stop plate 670 is secured to a mounting block 683 which has a top plate 684 extending across the channel 661, Figure 19, and mounts a clamping arm 686 by means of a bracket 687, the clamping arm 686 being pivotally secured to the bracket 687 by means of a pivot stud 689 and collar 690 and carrying at its lower end a roller 691 for riding on the top surface of the drop channel 661. It will be observed from Figures 19 and 20 that the top plate 684 carries a depending bracket 693 by means of a screw 694 depending through an elongated slot 695 in the top plate. At the lower end of the bracket 693 is a clamping block 697 having a recess 698 for receiving the lower portion of the channel 661 and having a flange 699 for retaining the block with the channel. In Figures 20 and 21, the clamping arm 686 is pivoted about the stud 689 to raise the clamping assembly relative to the drop-off channel 661 for adjustment of the stop plate 670 along the channel. When the stop plate 670 is in the proper position, the arm 686 is released to lower the clamping assembly relative to the channel 661 so that the upper surface 697a of the recess 698 of the clamping block 697 rests on the upper surface 661a of the channel 661 whereupon the stop plate 670 is fixedly positioned along the channel 661.

Referring now to the lock device of Figures 22 through 24, it will be observed that the stop plate 670 is secured to a block 705 which is interconnected with the block 683 by means of a shaft 706. As seen in Figure 22, an elongated bracket 710 carried by the block 705 has a roller 711 riding on the top edge of the back plate 655, and pivotally carries an arm 713 at the opposite end by means of a pivot stud 714 and collar 715, the arm 713 carrying a roller 717 also riding on the top edge of the back plate 655. The arm 713 is pivoted to raise the bracket 710 out of engagement with the back plate 655 to move the stop plate 670 therealong. When the arm 713 is released, a depending portion of the bracket 710 rests on the uper edge of the back plate 655 to prevent movement of the stop plate 670. Further, a plate 720 depends from the bracket 710 and carries a set screw 721 for fixing the position of the locking device as indicated in Figure 24.

Referring again to Figures 4 and 8, it will be understood that the hoppers 680 and 681 are carried on a shaft 730 by means of frames 731 and 732 so that rotation of the shaft 730 will raise the hoppers 680 and 681 away from a stack of sheets collected thereby so that the stack may be removed on a suitable wheeled transporting device. It will be observed that the hoppers 680 and 681 are illustrated as being counterbalanced by counterweights 735 and 736, and that a hand wheel 733 is indicated for rotating the shaft 730. It will be understood that the frameworks 731 and 732 are above the level of discharge of the sheets from the take-off ropes 622 so that the forward edges of the sheets as they are discharged from the take-off mechanism engage the front of the hoppers 680 and 681 and descend in a neat stack onto any transporting mechanism which may be positioned below the hoppers 680 and 681. The front plate 604 serves to align the rear edges of the sheets. An angle member 740 extends upwardly from the side frame 624 on the right side of the machine and engages the counterweight threaded shaft 741 to properly position the hoppers 680 and 681 in their operative position. It will be observed that the frames 731 and 732 are connected with sleeves 743 and 744 slidable on the shaft 730 and fixed in the desired position by means of set screws 746 and 747. Likewise, each of the frames 731 and 732 may comprise a pair of telescoping parts 731a, 732a and 731b, 732b with set screws 749 and 750 determining the spacing of the hoppers 680 and 681 from the front plate of the take-off mechanism, Figure 4.

In field testing the machine it has been found desirable to vary the amount the boxboards overlap the edge of drop-off channel 661 with different production speeds. For example at higher speeds, most efficient operation was obtained with a minimum overlap on the drop-off channel.

For adjusting the degree of overlap, the left end of the drop-off channel 661 may be provided with a suitable adjustment mechanism. Such mechanism is illustrated in Figure 4 as comprising a bracket 800 mounted on a side frame member 801 and receiving an arm 802 which is attached to the channel 661. The arm has an elongated slot for receiving a clamp screw 804, the clamp screw being threaded into bracket 800 for clamping the arm thereto. Thus the left end of channel 661 may be adjusted to the desired position along a horizontal supporting ledge or the like and clamped in such position by screw 804.

The right end of the drop-off channel is mounted by means of a support leg 810, Figure 8, which is shiftable along member 600a of base framework 600 by means of a handwheel 811. The handwheel is secured to one end of an adjusting screw 812 threadedly carried in a nut block 813 secured to frame member 600a. The opposite end of the screw is rotatably journaled in an abutment plate 815, and fixed against axial movement relative thereto by means of collars 816 and 817. The plate 815 is secured to a base plate 819 which is slidable on member 600a and carries the support leg 810. Thus rotation of handwheel 811 serves to shift base plate 819 and leg 800 to adjust the position of drop-off channel 661. Clamping bolts 821 extend through elongated slots in base plate 819 and serve to clamp the base plate in adjusted position.

In addition to controlling the amount of overlap, it has been found desirable to control the parallelism between the edge of the drop-off channel and the edge of the box blank. At higher speeds, the drop-off channel is preferably set at a slight angle with respect to the edge of the box blank, with less overlap near the stop plate 670 than at the end of the drop-off channel nearest the discharge rollers 523. The separate adjustment for each end of the drop-off channel readily accommodates this angular adjustment of the drop-off channel.

The drop-off channel 661 is also preferably tilted as shown in Figure 20, so that the blanks will ride on the flat sloping surface 661a of the channel rather than on the edge thereof.

As seen in Figure 16, the deflector 660 may be vertically adjustable relative to the drop-off channel by means of vertical slot 825 in deflector mounting plate 826 and bolt 827.

Operation

The operation of the machine constituting one embodiment of the invention will now be readily apparent. The machine is loaded by placing a stack of sheets 88 on the shuttle as indicated in Figure 10 with the front edges of the sheets of the stack supported above the table by means of the ledges 90 of the cradles 75. When the machine is set in motion, the rocker shaft 155, Figure 10, is rocked by means of the shuttle drive to oscillate the arm 152 which in turn reciprocates the carriage 117 in the tracks 127 to reciprocate the kick bar 109. As the kick bar 109 is moved to the front of the machine, Figure 10, the spring 111 is operative to raise the edge 112a into engagement with the front edge of the lowermost sheet of the stack 88. As the carriage 117 is driven rearwardly, the sheet is fed into the draw rolls 192 for delivery to the suction transfer station.

As seen in Figure 13, as the sheets enter the suction transfer station on the transfer ropes 261, their rearward travel is halted by means of the sheet-positioning mechanism 262, and the sheet is raised by suction into engagement with the suction conveyor belt 412 for transfer in a longitudinal direction through the work station. Since as soon as a sheet enters the suction transfer station, it is raised off the ropes 261, a further sheet may be delivered immediately behind the first sheet so as to be raised onto the suction conveyor belt 412 immediately behind the first sheet.

The suction conveyor delivers the sheets to the feed rolls 521, Figure 4, of the tape-applying mechanism from whence the sheets are discharged by the rollers 523 onto the take-off mechanism.

As the sheets are delivered from the discharge rolls 523 of the tape-applying mechanism, Figure 16, the front edge of the sheet rides on the drop-off channel 661 until the sheet is clear of the discharge rollers 523. The leading edge of the sheet strikes the stop plate 670 and the sheet slides rearwardly onto the take-off ropes 622 and off the channel 661. The take-off ropes 622 then deliver the sheet into the discharge pile defined by the hoppers 680 and 681, Figure 4, where the sheets may be stacked on a suitable transporting mechanism. When a stack of sheets is present at the discharge end of the machine, the hand wheel 738, Figure 4, is manipulated to raise the hoppers 680 and 681 away from the stack so that the stack may be removed from the machine.

By way of example, a machine according to the present invention may be adjustable to accommodate boxboard blanks of a minimum size of 15 inches by 48 inches and of a maximum size of 48 inches by 96 inches. If a machine is to be adjusted to accommodate the smaller sized boxboards, the left end guide 77, Figure 4, and sheet dam members 76 are moved toward the right of the machine, and the gib bar 80 is moved rearwardly to position the cradle members 75 in proper relation to the sheet dam members 76 and end guides 77 for the size sheet to be accommodated, the smaller size sheets being fed to the front, right-hand portion of the suction conveyor, which is disposed to the right of damper 437 in Figure 9 and in front of splitter plate 430. The amount of suction at the front, right-hand portion of the suction box of the suction conveyor may be adjusted by means of the damper 435, Figure 7, and damper 437, Figure 9, in conjunction with splitter plate 430, Figures 9 and 13. Likewise, the sheet stop mechanism 262, Figures 6 and 13, is adjusted by means of the crank 330, Figure 6, to position the sheets at the forward end of the suction conveyor, to the right of splitter plate 430 in Figure 13. Similarly, the stop plate 670 of the take-off mechanism 33, Figure 4, is adjusted along with the hopper 681 to accommodate the smaller size sheets.

*Modified shuttle draw roll assembly*

Figure 25:
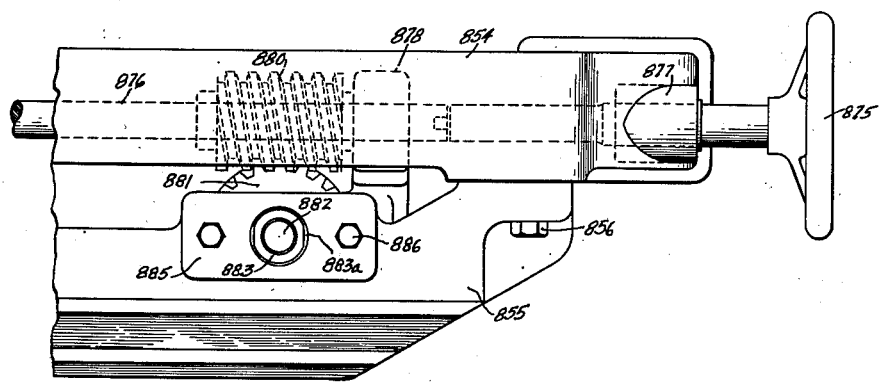
Figure 25 is a fragmentary top plan view of a modified shuttle draw roll assembly according to the present invention.
Figure 26:
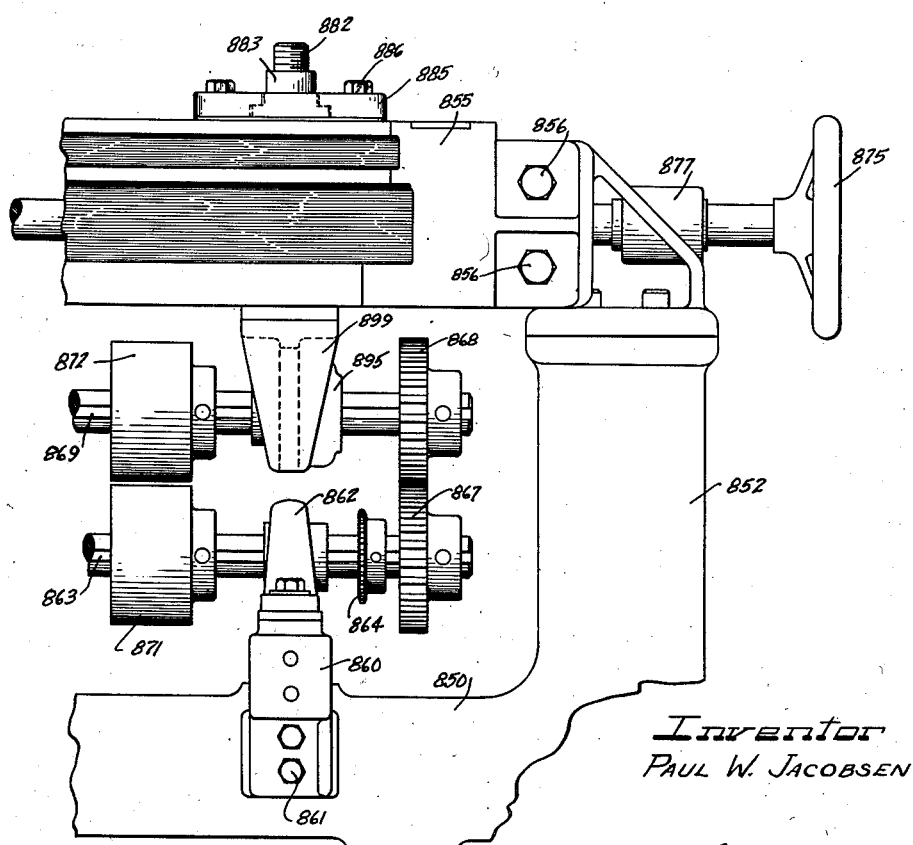
Figure 26 is a fragmentary front elevational view of the structure of Figure 25.

A modified form of shuttle draw roll assembly is illustrated in Figures 25, 26 and 27. It will be observed that in this embodiment a cast frame construction is utilized and it is to be understood that the entire machine may be constructed in this manner. The frame includes lower draw roll horizontal members 850 and 851, Figure 27, and an upright member 852. Shuttle arch member 854 is secured to upright 852 and has front shuttle arch member 855 secured thereto by cap screws 856, Figure 25. The horizontal frame member 851 supports a fore-aft frame member 858 which carries a shuttle deck plate 859.

Saddle block 860 is disposed between horizontal members 850 and 851 as seen in Figure 27 and may be secured to member 850 by screws 861, Figure 26. Bearing mounting 862 is carried by the saddle block 860 and journals the lower draw roll shaft 863. The shaft is driven by sprocket 864 from the shuttle drive as in the first-described embodiment. As previously, spur gears 867 and 868 serve to drive the upper draw roll shaft 869 from the lower shaft. Suitable upper and lower draw rolls 871 and 872 serve to feed the box-boards into the suction conveyor section of the machine.

For vertically adjusting the upper draw roll shaft 869, a handwheel 875 is secured to a worm shaft 876 extending the length of the shuttle arch. The hand wheel is journalled in a sleeve portion 877 of member 854, and the shaft 876 is carried in journals 878. Worm portions 880 are secured at spaced intervals to the shaft 876 and mesh with worm wheels 881 to turn vertical screw 882. The screw 882 is threadedly engaged in a nut 883 which is normally clamped against rotation by means of plate 885 and screws 886, the screws engaging a flange portion 887 of arch member 855. Thus rotation of screw 882 causes the screw to be raised or lowered in nut 883, the screw being secured to the worm wheel 881 so as to accommodate vertical movement of the screw relative to the worm wheel, as by means of a splined connection, or a pin and slot such as shown at 235 and 237 in the previous embodiment. The worm wheel is fixed against vertical movement between boss 890 depending from flange portion 887, Figure 27, and boss 891 on lower flange 892 of the arch member 855. The lower end of the screw 882 is retained in an aperture 894 of the bearing block 895 by means of a collar 896, and the bearing block is guided in its vertical movement by means of bearing guide supports 898 and 899 depending from arch members 854 and 855.

For adjusting the position of one upper draw roll 872 relative to the others, the nut parts 883 are provided with flat opposed faces 883a, Figure 25, so that when the clamping plates 885 are loosened, the nuts 883 can be individually rotated to make fine adjustments of the relative positions of the screws 882.

As indicated in Figure 27, the front shuttle arch member may carry a modified sheet dam assembly 902 by means of opposed shoulders 903 and 904 thereof. The assembly includes a support 905 slidable horizontally along angularly related faces of member 855 and having opposed flanges 906 and 907 engaging the shoulders to retain the support on the member 855. Set screw 909 is provided for fixing the position of support 905 along the member 855.

For adjusting the spacing of sheet dam member 910 above the shuttle deck plate 859, the sheet dam member is vertically slidable in a guide plate 911 and is fixed relative thereto by means of set screw 912. For raising and lowering the sheet dam member, an adjustment screw 914 is threaded through an offset portion 915 of the sheet dam member and has its lower end abutting the top face of support 905.

*Modified shuttle sheet stop assembly*

A modified form of sheet stop assembly is illustrated in Figures 28 and 29 and may replace the assembly 262 previously described. The stop plate 920 is supported from uprights 918 and 919, and horizontal frame members 921 and 922 by means of generally triangular side plates 923 and 924 having rollers 925 riding on track strips 926 and 927. The plate 920 is provided with suitable apertures 929 for receiving the shuttle transfer belts therethrough in a manner similar to the previous embodiment.

For adjusting the position of the stop plate 920 for different size sheets, a pair of racks 931 and 932 extend along the strips 926 and 927 and have gears 933 and 934 meshing therewith. The gears are rotated by means of a handwheel 935 and shaft 936. Hold-down plates 938 and 939 have flanges 938a and 939a riding in grooves 940 and 941 in strips 926 and 927 to stabilize the assembly.

To fix the stop plate assembly in a selected position, a pair of wedge members 944 and 945 are provided for straddling the racks 931 and 932 and for opposing movement of rollers 925 along strips 926 and 927. The roller opposing faces of members 944 and 945 may be sloping so as to prevent movement of the rollers, in conjunction with hold-down plates 938 and 939. Set screws having threaded shank portions 947 and 948 are utilized to fix the positions of wedge members 944 and 945 along the strips 926 and 927.

*Modified hopper raising mechanism*

As illustrated in Figures 30 and 31, the hand wheel 738 of the previous embodiment may be replaced by a single acting air cylinder 960 operating a rack 961 and gear 962 for raising the stacking cages 680 and 681 of Figure 4 through the shaft 730. The cylinder 960 may be secured to an upright frame member 964 which may carry a rack guide bracket 965 for guiding the vertical movement of the rack. A stop plate 966 may be carried on the end of the piston rod which is secured to rack 961. The cylinder may be of the cushioned rod end adjusting type.

It will be understood that modifications and variations may be effected without departing from the scope of the novel concepts of the present invention.

I claim as my invention:

1. In an apparatus for conveying boxboard units through a change of direction in a transfer zone, boxboard transfer means comprising means for feeding said boxboard units in series into said transfer zone with the boxboard units moving edgewise in an entering plane into said zone, means for individually bodily shifting each successive boxboard unit as it reaches said transfer zone in a direction generally normal to said entering plane but in a direction different from the direction in which gravity tends to move said boxboard units and through a distance greater than the thickness of said boxboard units, and means for individually moving the successive boxboard units which have been shifted in said transfer zone out of said transfer zone in a series in a direction different from the direction in which said boxboard units enter said transfer zone, said boxboard transfer means being operative to feed said boxboard units out of said transfer zone with a spacing between successive boxboard units less than the extent of the boxboard units in the direction in which the boxboard units move into said transfer zone without requiring contact of an entering boxboard unit moving into said transfer zone with a preceding boxboard unit leaving said transfer zone.

2. In an apparatus for conveying boxboard units through a change of direction in a tranfer zone, boxboard transfer means comprising means for feeding said boxboard units in series into said transfer zone with the boxboard units moving edgewise in a horizontal plane into said zone, suction means above said transfer zone for individually bodily shifting each successive boxboard unit upwardly as it reaches said transfer zone and through a distance greater than the thickness of said boxboard unit, and means for individually moving the successive boxboard units which have been raised in said transfer zone out of said transfer zone in a series in a direction different from the direction in which said boxboard units enter said transfer zone, said boxboard transfer means being operative to feed said boxboard units out of said transfer zone with a spacing between successive boxboard units less than the extent of the boxboard units in the direction in which the boxboard units move into said transfer zone without requiring contact of an entering boxboard unit moving into said transfer zone with a preceding boxboard unit leaving said transfer zone.

3. In an apparatus for conveying boxboard units through a change of direction in a transfer zone, means for feeding said boxboard units in series into said transfer zone with the boxboard units moving edgewise in an entering plane into said zone, means for individually bodily shifting each successive boxboard unit as it reaches said transfer zone in a direction generally normal to said entering plane and through a distance greater than the thickness of said boxboard units, means for individually moving the successive boxboard units which have been shifted in said transfer zone out of said transfer zone in a series in a direction different from the direction in which said boxboard units enter said transfer zone, and means for maintaining each boxboard unit entering said transfer zone substantially out of contact with the preceding boxboard unit which has been shifted and is leaving said transfer zone during appreciable edgewise motion of the entering boxboard unit.

4. In an apparatus for conveying boxboard units, means for feeding said boxboard units in series into a transfer zone with the boxboard units moving edgewise in a horizontal plane into said zone, means for individually bodily shifting each successive boxboard unit upwardly as it reaches said transfer zone and through a distance greater than the thickness of said boxboard units, means for individually moving the successive boxboard units which have been shifted in said transfer zone out of said transfer zone in a series in a direction different from the direction in which said boxboard units enter said transfer zone and in a generally horizontal plane, means defining a discharge zone in the path of movement of said boxboard units from said transfer zone, means for supporting one edge of said boxboard units as the boxboard units successively enter said discharge zone with one edge of said boxboard units progressively moving along said supporting means as said boxboard units enter said discharge zone while leaving the opposite edge of said boxboard units unsupported in said discharge zone, and a discharge conveyor movable in a direction generally transverse to the direction of movement of said boxboard units into said transfer zone and having a lower portion thereof disposed below said discharge zone for receiving the successive boxboard units when they have completely entered said discharge zone and have fallen out of engagement with said edge supporting means.

5. The apparatus of claim 4 wherein stop means is adjustable along said edge supporting means to interrupt travel of said boxboard units into said discharge zone at different points along said edge supporting means to accommodate different size boxboard units.

6. The apparatus of claim 4 wherein sheet stop means is disposed in the path of travel of said boxboard units into said discharge zone for interrupting travel of said boxboard units along said edge supporting means, and means is provided for adjusting the position of said sheet stop means along said edge supporting means including roller means for riding on said edge supporting means, and lever means engaging said stop means at one end and pivotal on said roller means for raising said stop means with said roller means as a fulcrum in adjusting said stop means along said edge supporting means.

7. In an apparatus for conveying boxboard units through a change of direction in a discharge zone, means for feeding said boxboard units in series into said discharge zone with the boxboard units moving edgewise in a generally horizontal plane into said zone, means for supporting an edge of each boxboard unit as it enters said discharge zone with said edge of each boxboard unit moving along said supporting means at one side of said discharge zone while leaving the opposite edge of each of said boxboard units unsupported in said discharge zone, and an inclined discharge conveyor movable in a direction generally transverse to the direction of movement of said boxboard units into said discharge zone and having a lower portion thereof disposed below said discharge zone for receiving the successive boxboard units when they have completely entered said discharge zone and have fallen out of engagement with said edge supporting means.

8. In an apparatus for conveying boxboard units through a change of direction in a transfer zone, conveyor means for feeding said boxboard units in series into said transfer zone with the boxboard units moving edgewise in a horizontal plane, discharge conveyor means above said feeding conveyor means and moving in a direction generally transverse to said feeding conveyor means and overlying said transfer zone, overhead suction means disposed above said transfer zone and associated with said discharge conveyor means for individually bodily shifting each successive boxboard unit upwardly into engagement with said discharge conveyor means as said successive boxboard units reach said transfer zone, and said discharge conveyor means being spaced above said feeding conveyor means a distance greater than the thickness of said boxboard units to prevent contact between boxboard units entering said transfer zone and boxboard units leaving said transfer zone by means of said discharge conveyor means.

9. The apparatus of claim 8 wherein means is interposed in the path of travel of said boxboard units into said transfer zone for interrupting edgewise movement of said boxboard units in said transfer zone, and rebound stop means is disposed at the side of said transfer zone where said boxboard units enter said transfer zone and opposite said interposed means and above the path of travel of said boxboard units into said transfer zone, said rebound stop means being deflectable into the path of travel of said boxboard units into said transfer zone to prevent reverse movement of said boxboard units and to confine said boxboard units for vertical movement in said transfer zone.

References Cited in the file of this patent
UNITED STATES PATENTS

| | | |
|---|---|---|
| 1,295,123 | Cheshire | Feb. 25, 1919 |
| 1,335,043 | Cheshire | Mar. 30, 1920 |
| 1,437,744 | Berenson | Dec. 5, 1922 |
| 1,460,260 | Litchfield | June 26, 1923 |
| 1,724,077 | Fleischer | Aug. 13, 1929 |
| 1,853,781 | Rider | Apr. 12, 1932 |
| 1,890,250 | Evans | Dec. 6, 1932 |
| 1,897,641 | Pflanze | Feb. 14, 1933 |
| 1,981,470 | Rundell | Nov. 20, 1934 |
| 1,987,803 | Ryan | Jan. 15, 1935 |
| 2,052,526 | Broadmeyer | Aug. 25, 1936 |
| 2,106,199 | Wormer | Jan. 25, 1938 |
| 2,224,886 | Tyler | Dec. 17, 1940 |
| 2,230,420 | Wilber | Feb. 4, 1941 |
| 2,315,003 | Martin | Mar. 30, 1943 |
| 2,464,569 | Ford | Mar. 15, 1949 |
| 2,490,881 | Peters | Dec. 13, 1949 |
| 2,518,799 | Leonard | Aug. 15, 1950 |
| 2,555,061 | Shields | May 29, 1951 |
| 2,561,030 | Morse | July 17, 1951 |
| 2,585,113 | Gredell | Feb. 12, 1952 |
| 2,600,674 | Natkins | June 17, 1952 |
| 2,643,530 | Lothrop | June 30, 1953 |
| 2,650,093 | Shields | Aug. 25, 1953 |
| 2,672,931 | Maher | Mar. 23, 1954 |
| 2,673,766 | Bechle | Mar. 30, 1954 |